US010564906B2

(12) United States Patent
Ando et al.

(10) Patent No.: US 10,564,906 B2
(45) Date of Patent: Feb. 18, 2020

(54) INFORMATION PROCESSING DEVICE, INFORMATION PROCESSING SYSTEM, AND INFORMATION PROCESSING METHOD FOR PRIORITIZING AN INSTALLATION OF PRINT DRIVERS ON INFORMATION PROCESSING DEVICE

(71) Applicants: Yoshihide Ando, Tokyo (JP); Youichi Minegishi, Kanagawa (JP); Mariko Tohma, Tokyo (JP)

(72) Inventors: Yoshihide Ando, Tokyo (JP); Youichi Minegishi, Kanagawa (JP); Mariko Tohma, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/414,541

(22) Filed: Jan. 24, 2017

(65) Prior Publication Data

US 2017/0220304 A1    Aug. 3, 2017

(30) Foreign Application Priority Data

Jan. 29, 2016    (JP) .................. 2016-015987

(51) Int. Cl.
*G06F 9/00* (2006.01)
*G06F 3/12* (2006.01)
*G06F 9/4401* (2018.01)
*H04N 1/00* (2006.01)

(52) U.S. Cl.
CPC .......... *G06F 3/1248* (2013.01); *G06F 3/1203* (2013.01); *G06F 3/1204* (2013.01); *G06F 3/1225* (2013.01); *G06F 3/1289* (2013.01); *G06F 9/4411* (2013.01); *H04N 1/00206* (2013.01); *H04N 1/00244* (2013.01)

(58) Field of Classification Search
USPC .................................. 358/1.1–3.29
See application file for complete search history.

(56) References Cited

U.S. PATENT DOCUMENTS

| 7,038,801 B2 | 5/2006 | Kurozasa et al. |
| 8,726,370 B2 | 5/2014 | Minegishi |
| 2004/0030810 A1* | 2/2004 | Lozano .................. G06F 9/4411 710/8 |

(Continued)

FOREIGN PATENT DOCUMENTS

| CN | 101359280 A | 2/2009 |
| CN | 101848298 A | 9/2010 |

(Continued)

OTHER PUBLICATIONS

European Search Report; Application No. 17151299.9-1879; dated Jun. 27, 2017.

(Continued)

*Primary Examiner* — Marcellus J Augustin
(74) *Attorney, Agent, or Firm* — Duft & Bornsen, PC

(57) ABSTRACT

An information processing device comprising circuitry configured to: acquire identification information for identifying a model; acquire attribute information indicating an attribute of each of a plurality of programs applicable to the model, based on the identification information; and select a program to be installed from the plurality of programs, based on a priority order that is determined in advance for the attribute information.

11 Claims, 15 Drawing Sheets

(56) References Cited

U.S. PATENT DOCUMENTS

| | | | |
|---|---|---|---|
| 2004/0167973 A1* | 8/2004 | Shima | H04L 29/12009 709/220 |
| 2006/0221372 A1* | 10/2006 | Onishi | G06F 3/1204 358/1.13 |
| 2007/0136485 A1* | 6/2007 | Mitsui | G06F 9/4411 709/230 |
| 2009/0033982 A1* | 2/2009 | Hwang | G06F 3/1204 358/1.15 |
| 2009/0217161 A1 | 8/2009 | Minegishi | |
| 2010/0245896 A1 | 9/2010 | Mishima | |
| 2012/0013926 A1 | 1/2012 | Sugai | |
| 2012/0026551 A1* | 2/2012 | Tarumi | G06F 3/1204 358/1.15 |
| 2014/0233050 A1* | 8/2014 | Kishida | G06F 3/1225 358/1.13 |
| 2015/0029527 A1* | 1/2015 | Nakata | G06F 3/12 358/1.13 |
| 2016/0274825 A1 | 9/2016 | Minegishi | |
| 2016/0274846 A1 | 9/2016 | Minegishi | |
| 2016/0274851 A1 | 9/2016 | Minegishi | |
| 2017/0160995 A1* | 6/2017 | Fukasawa | G06F 3/1204 |

FOREIGN PATENT DOCUMENTS

| | | |
|---|---|---|
| JP | 2000-330742 | 11/2000 |
| JP | 3728655 | 10/2005 |
| JP | 2007114900 A | 5/2007 |
| JP | 2008059373 A | 3/2008 |
| JP | 2012-252526 | 12/2012 |
| WO | 2016035801 A1 | 3/2016 |

OTHER PUBLICATIONS

Chinese office action; Application 201710054337.4; dated May 17, 2019.

Japanese Office Action; Application No. 2016-015987; dated Jul. 16, 2019.

* cited by examiner

FIG.11 https://1.example.com/Search/Web?Query='PrinterA'&OS='32bit'

FIG.12

```
1: <?xml version = "1.0" encoding = "UTF-8"?>
2: <Software>
3:      <Driver name="Printer A Driver" DriverArchitecture="V3 32bit
Printer Driver "PDL="PDL#1" language="ja, en" version="1.0.0.0"
DownloadURL="http://2.example.com/driver.zip"/>
                              ⋮
4: </Software>
```

INFORMATION PROCESSING DEVICE, INFORMATION PROCESSING SYSTEM, AND INFORMATION PROCESSING METHOD FOR PRIORITIZING AN INSTALLATION OF PRINT DRIVERS ON INFORMATION PROCESSING DEVICE

CROSS-REFERENCE TO RELATED APPLICATIONS

The present application claims priority under 35 U.S.C. § 119 to Japanese Patent Application No. 2016-015987, filed Jan. 29, 2016. The contents of which are incorporated herein by reference in their entirety.

BACKGROUND OF THE INVENTION

1. Field of the Invention

The present invention relates to an information processing device, an information processing system, and an information processing method.

2. Description of the Related Art

An installer that communicates with a server on a network while specifying a model of a printer, that searches the server for a driver program using page description language (PDL) supported by the model as a key to download the driver program, and that installs the downloaded driver program in a computer has been known. In general, manufacturers that manufacture and sell printers provide a driver program corresponding to a PDL that is suitable for each of the printers that the manufacturers manufacture and sell, and an installer corresponding to the driver program, for the users.

Japanese Unexamined Patent Application Publication No. 2012-252526 discloses a technique in which a manager uploads driver programs on a server and notifies a user of the driver program, and a screen is automatically generated on the basis of the numbers of downloads of the driver programs. Japanese Unexamined Patent Application Publication No. 2012-252526 enables a user to easily acquire a frequently used driver program.

In general, a plurality of driver programs corresponding to different PDLs are available for the same model. The PDLs supported by the driver programs of each model may differ between models. Thus, conventionally, it has been difficult to determine a single PDL that can be commonly recommended for multiple models. For example, examples of such cases include a case where a manufacturer may procure printers from another manufacturer to sell the printers, in such as an original equipment manufacturer (OEM).

The PDL suitable for an OEM printer may be different from the PDL suitable for a printer developed by the manufacturer itself. To acquire a driver program, the conventional installer cannot automatically select a suitable PDL from the PDLs, and it has been difficult to comply with both the printers made by the manufacturer itself as well as the OEM printers.

Thus, there has been a problem in that a user needs to acquire a driver program while explicitly selecting the required PDL. Japanese Unexamined Patent Application Publication No. 2012-252526 described above has not yet solved the problem that the user needs to explicitly select the driver program.

SUMMARY OF THE INVENTION

An information processing device includes circuitry. The circuitry is configured to acquire identification information for identifying a model. The circuitry is further configured to acquire attribute information indicating an attribute of each of a plurality of programs applicable to the model, based on the identification information. The circuitry is still further configured to select a program to be installed from the plurality of programs, based on a priority order that is determined in advance for the attribute information.

BRIEF DESCRIPTION OF THE DRAWINGS

FIG. 11 is a diagram illustrating an example of a search request transmitted from a control unit to the server that is applicable to the first embodiment;

FIG. 12 is a diagram illustrating an example of a search result transmitted from the server applicable to the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
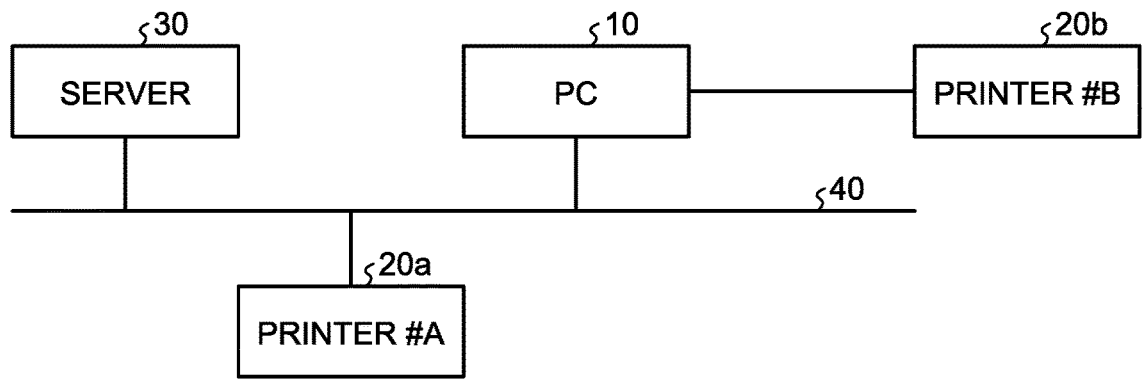
FIG. 1 is a diagram illustrating an exemplary configuration of an information processing system applicable to embodiments.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Preferred embodiments of an information processing device, an information processing system, and an information processing method will now be described in detail with reference to the accompanying drawings.

An embodiment has an object to easily acquire a driver program suitable for a model.

Configuration Applicable to Embodiments

FIG. 1 is an exemplary configuration of an information processing system applicable to the embodiments. In FIG. 1, the information processing system includes a personal computer (PC) 10, printers 20a and 20b, and a server 30. In FIG. 1, the printers 20a and 20b are also indicated as a printer #A and a printer #B. In the example in FIG. 1, the PC 10, the printer 20a, and the server 30 are communicably connected with each other via a network 40 such as a local area network (LAN). Also, in the example in FIG. 1, the printer 20b is connected directly to the PC 10 via a universal serial bus (USB) or the like.

In such a configuration, for example, the PC 10 can cause the printer 20a or the printer 20b to execute a printing process, by installing a driver program of the printer 20a or the printer 20b. In this example, the PC 10 can acquire the driver program of the printer 20a or the printer 20b from the server 30 via the network 40, for example.

In the above, the PC 10, the printer 20a, and the server 30 are connected via the network 40 through the LAN. However, this is not essential. For example, one or more of the PC 10, the printer 20a, and the server 30 may be connected via the Internet. The network 40 may be wired or wireless, or may be a combination of wired and wireless.

In the example of FIG. 1, only the printers 20a and 20b are illustrated as devices that the PC 10 can use. However, this is not essential. A scanner, or a multifunction printer (MFP) in which multiple functions such as a printer function, a scanner function, and a copy function are integrated into a single housing, may be included as devices that the PC 10 can use.

Except that the printers 20a and 20b are connected differently to the PC 10, the printers 20a and 20b can be handled as equivalents, and thus in the following, unless otherwise specified, the printer 20a is explained as the representative for the printers 20a and 20b.

Figure 2:
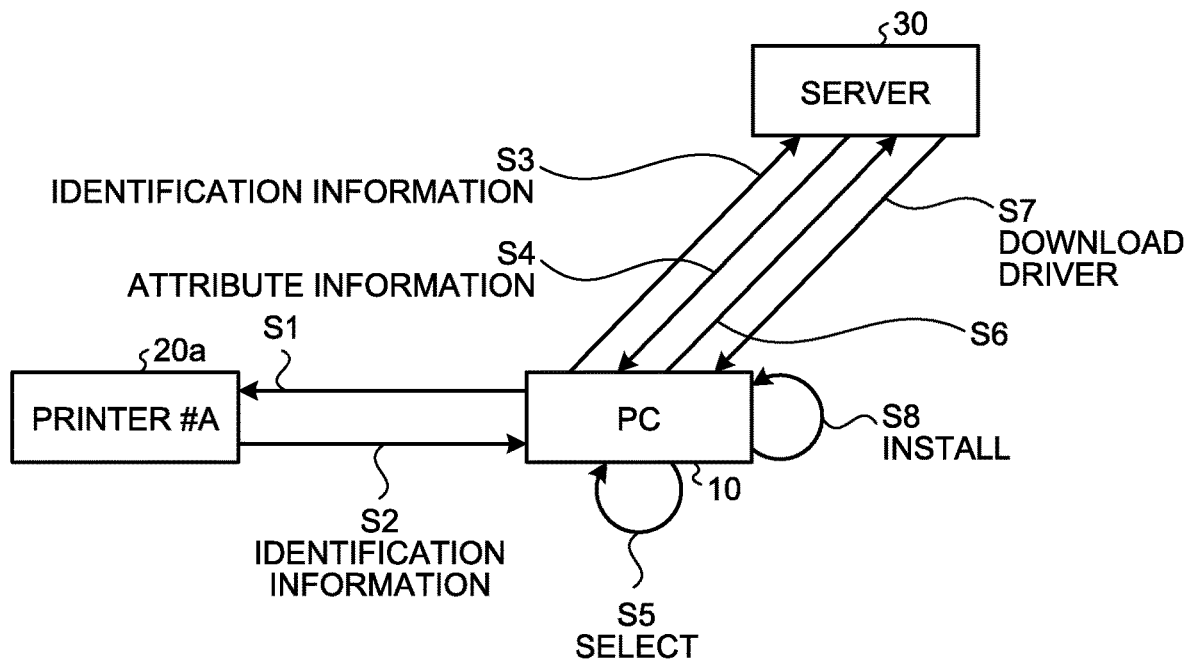
FIG. 2 is a schematic diagram of an acquisition process of a driver program executed by a PC applicable to the embodiments.

FIG. 2 schematically illustrates an acquisition process of a driver program executed by the PC 10 applicable to the embodiments. To acquire a driver program so as to use the printer 20a, the PC 10 first acquires identification information for identifying the printer 20a, from the printer 20a (steps S1 and step S2). As the identification information for identifying the printer 20a, a plug and play (PnP) device ID can be used.

Upon receiving the identification information of the printer 20a, the PC 10 transmits the acquired identification information and a request for acquiring a driver program of the printer 20a, to the server 30 (step S3). In this example, the server 30 stores therein attribute information of driver programs of printers in association with a plurality of models of the printer. The attribute information of a driver program includes at least acquisition information for acquiring the corresponding driver program. For example, the acquisition information includes a uniform resource locator (URL) that specifies a position of the driver program on the network 40 or on the Internet that is connected via the network 40. When the driver program is stored in the server 30, as the acquisition information, an URL of the position of a storage area of the driver program in the server 30, on the network 40, can be used.

The server 30 searches the stored attribute information for the attribute information of the driver program corresponding to the identification information on the basis of the request and the identification information transmitted from the PC 10, and transmits one or more pieces of the attribute information searched for, to the PC 10 (step S4). Based on the one or more pieces of attribute information transmitted from the server 30, the PC 10 selects a driver program to be installed (step S5). The PC 10 requests to download (DL) the driver program on the basis of the acquisition information that is included in the attribute information corresponding to the selected driver program (step S6).

For the sake of explanation, in the example in FIG. 2, it is illustrated that the server 30 stores therein the driver program. However, this is not essential. For example, the driver program may be stored in another server on the network 40, or in a server on the Internet that is connected via the network 40.

The PC 10 acquires the driver program downloaded in response to the download request at step S6 (step S7). The PC 10 then installs the acquired driver program in the PC 10 itself (step S8). In this manner, the PC 10 becomes able to use the printer 20a.

Figure 3:
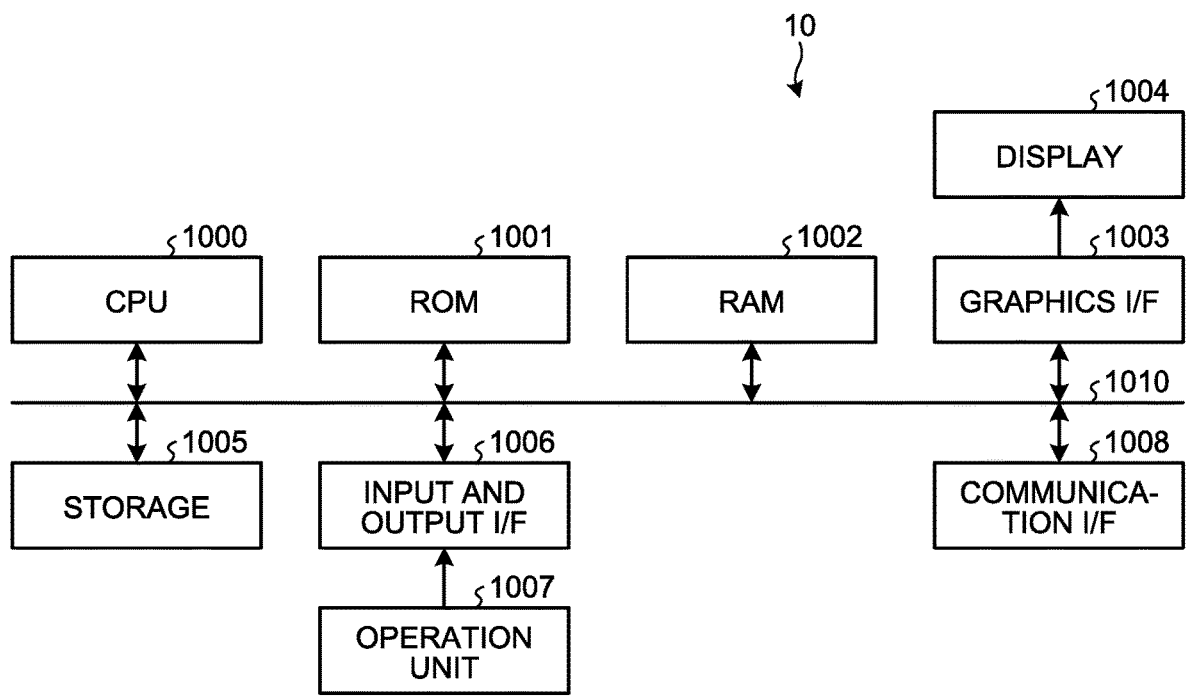
FIG. 3 is a block diagram illustrating an example of a hardware configuration of the PC applicable to the embodiments.

FIG. 3 is an example of a hardware configuration of the PC 10 applicable to the embodiments. In the PC 10 in FIG. 3, a central processing unit (CPU) 1000, a read only memory (ROM) 1001, a random access memory (RAM) 1002, storage 1005, a graphics interface (I/F) 1003, an input and output I/F 1006, and a communication I/F 1008 are communicably connected with each other via a bus 1010.

The CPU 1000 controls the entire operation of the PC 10 on the basis of programs stored in advance in the ROM 1001 and/or the storage 1005, using the RAM 1002 as a work memory. The storage 1005 is a hard disk drive or a nonvolatile semiconductor memory (flash memory), and stores therein programs for operating the CPU 1000 and various types of data.

The graphics I/F 1003 converts a display control signal generated on the basis of the program by the CPU 1000, to a display signal that can be displayed on a display 1004, and supplies the display signal to the display 1004. For example, the display 1004 uses a liquid crystal display (LCD) as a display device, and causes the display device to display a screen according to the display signal that is supplied from the graphics I/F 1003.

The input and output I/F 1006 is an interface for communicating with an external device. In the example in FIG. 3, an operation unit 1007 including a keyboard and/or a pointing device (such as a mouse) is connected to the input and output I/F 1006 as the external device. However, this is not essential, and the input and output I/F 1006 may be connected to a drive device that reads out data from a disk storage medium such as a compact disc (CD) and a digital versatile disc (DVD), or storage such as a nonvolatile semiconductor memory. For example, a USB can be used as the input and output I/F 1006.

The communication I/F 1008 communicates via the network 40 on the basis of the control by the CPU 1000, and using a predetermined protocol such as a Transmission Control Protocol/Internet Protocol (TCP/IP).

Figure 4:
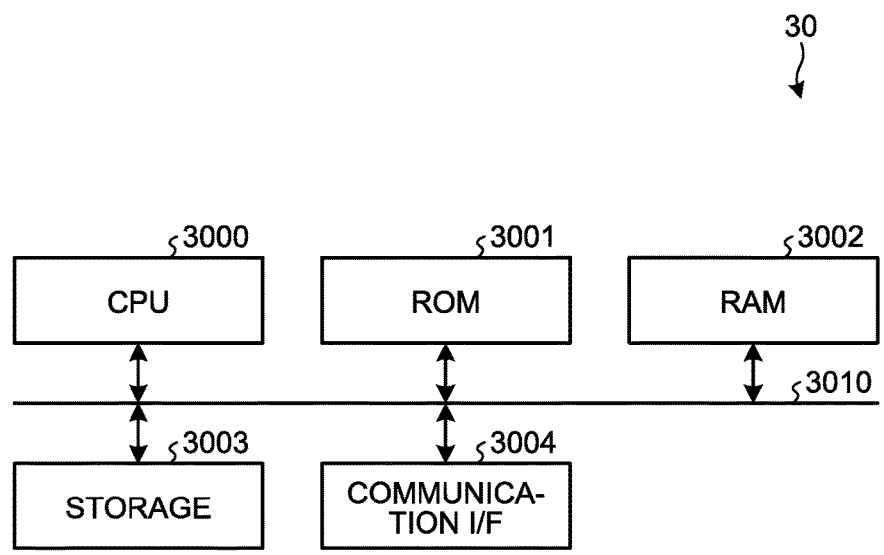
FIG. 4 is a block diagram illustrating an example of a hardware configuration of a server applicable to the embodiments.

FIG. 4 is an example of a hardware configuration of the server 30 applicable to the embodiments. In FIG. 4, the server 30 includes a CPU 3000, a ROM 3001, a RAM 3002, storage 3003, and a communication I/F 3004, which are communicably connected with one another via a bus 3010.

For example, the storage 3003 is a hard disk drive or a nonvolatile semiconductor memory such as a flash memory. The storage 3003 stores therein the programs that run on the CPU 3000 and various types of data, as well as attribute information of a driver program, which will be described below. Instead of being incorporated in the server 30, the storage 3003 may also be externally connected to the server 30.

The CPU 3000 controls the entire operation of the server 30 on the basis of the programs read out from the ROM 3001 and the storage 3003, using the RAM 3002 as a work memory. For example, the communication I/F 3004 communicates via the network 40 on the basis of the control by the CPU 3000, and using the TCP/IP as a protocol.

The configuration of the server 30 is not limited to the example illustrated in FIG. 4, and as a general computer, the server 30 may also include a display control unit, a data I/F, and an input device, for example. The display control unit displays a screen corresponding to screen information generated by the CPU 3000, on a display. The data I/F inputs and outputs data to and from the external device. The input device receives a user input.

Figure 5:
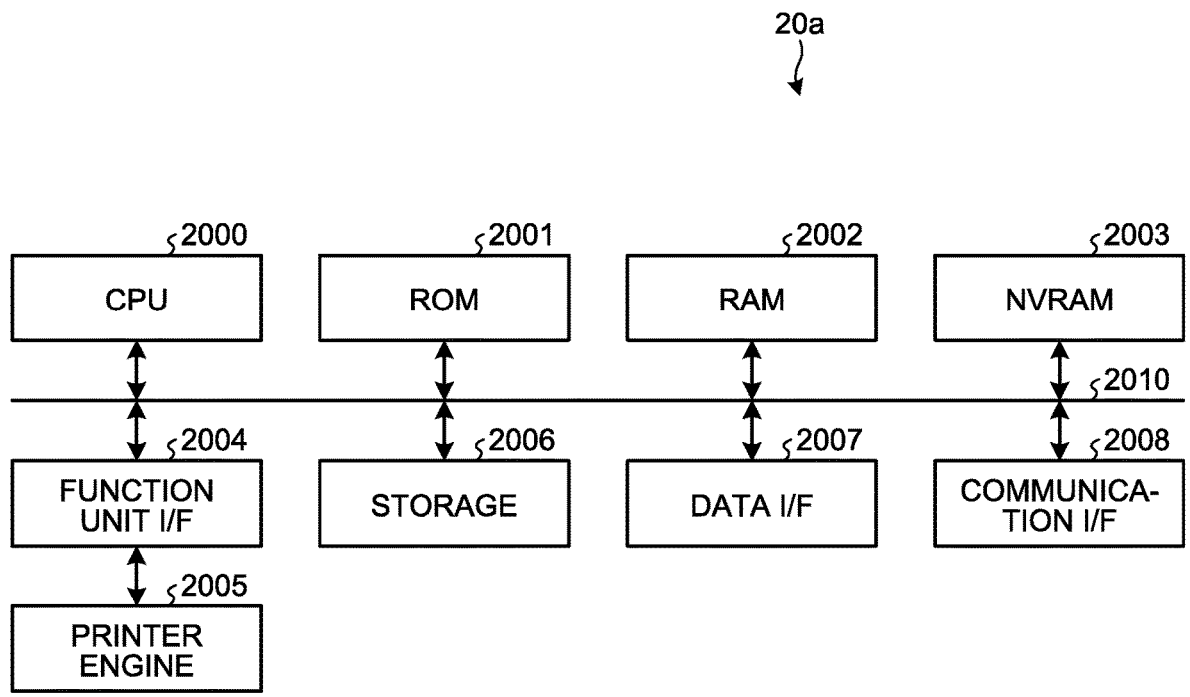
FIG. 5 is a block diagram illustrating an example of a hardware configuration of a printer applicable to the embodiments.

FIG. 5 is an example of a hardware configuration of the printer 20*a* applicable to the embodiments. In FIG. 5, the printer 20*a* includes a CPU 2000, a ROM 2001, a RAM 2002, a nonvolatile random access memory (NVRAM) 2003, storage 2006, a data I/F 2007, a communication I/F 2008, and a function unit I/F 2004, which are communicably connected with one another via a bus 2010.

The storage 2006 is a hard disk drive or a nonvolatile memory such as a flash memory, and stores therein programs for operating the CPU 2000 and various types of data. For example, the ROM 2001 stores therein in advance programs and data used to activate the printer 20*a* as well as identification information for identifying the model of the printer 20*a* (such as a PnP device ID). The NVRAM 2003 stores therein a setting value set for the printer 20*a*, and/or the like. The CPU 2000 controls the entire operation of the printer 20*a* on the basis of the programs stored in the storage 2006 and the ROM 2001 as well as various types of data stored in the storage 2006 and the NVRAM 2003, using the RAM 2002 as a work memory.

For example, the data I/F 2007 is an interface for the external device, and may be a USB. For example, the communication I/F 2008 communicates via the network 40 on the basis of the control by the CPU 2000, and using the TCP/IP as a protocol.

The function unit I/F 2004 is an interface of a printer engine 2005 for implementing the printer function of the printer 20*a*. The function unit I/F 2004 performs the arbitration process of data between the printer engine 2005 and the CPU 2000, transmits and receives control information, and/or the like.

When a scanner is to be used, a scanner engine for implementing a scanner function is connected instead of the printer engine 2005. Also, if the MFP is to be used, a scanner engine, a printer engine, and a facsimile (FAX) unit are connected to the function unit I/F 2004 so that the MFP can execute multiple functions such as a scanner function, a printer function, a FAX function, and the like.

First Embodiment

A first embodiment will now be described. In the first embodiment, a priority order is determined in advance for pieces of the attribute information of the driver programs that are applicable to the same model, regarding the driver programs stored in the server 30. In the selection process of the driver program at step S5 in FIG. 2 illustrated above, the driver program that matches with the PC 10 is selected on the basis of the priority order.

Figure 6:
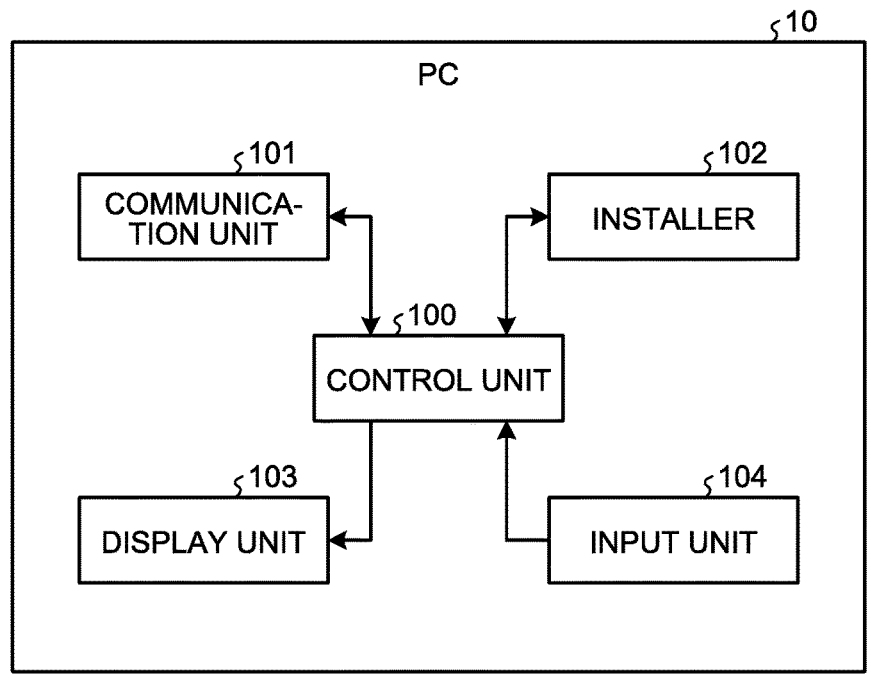
FIG. 6 is an exemplary functional block diagram for explaining functions of a PC according to a first embodiment.

FIG. 6 is an exemplary functional block diagram for explaining functions of the PC 10 according to the first embodiment. The PC 10 includes a control unit 100, a communication unit 101, an installer 102, a display unit 103, and an input unit 104. The control unit 100, the communication unit 101, the installer 102, the display unit 103, and the input unit 104 are implemented using the programs that run on the CPU 1000. However, this is not essential, and a part or all of the control unit 100, the communication unit 101, the installer 102, the display unit 103, and the input unit 104 may be constructed by hardware circuits that operate in cooperation with one another.

The control unit 100 performs various determination processes on the basis of the programs, and controls the entire operation of the PC 10. The communication unit 101 controls communication by the input and output I/F 1006 and the communication I/F 1008. The installer 102 installs a driver program in the PC 10. The display unit 103 controls the graphics I/F 1003, and displays an image on the display 1004. The input unit 104 receives an input to the operation unit 1007.

Figure 7:
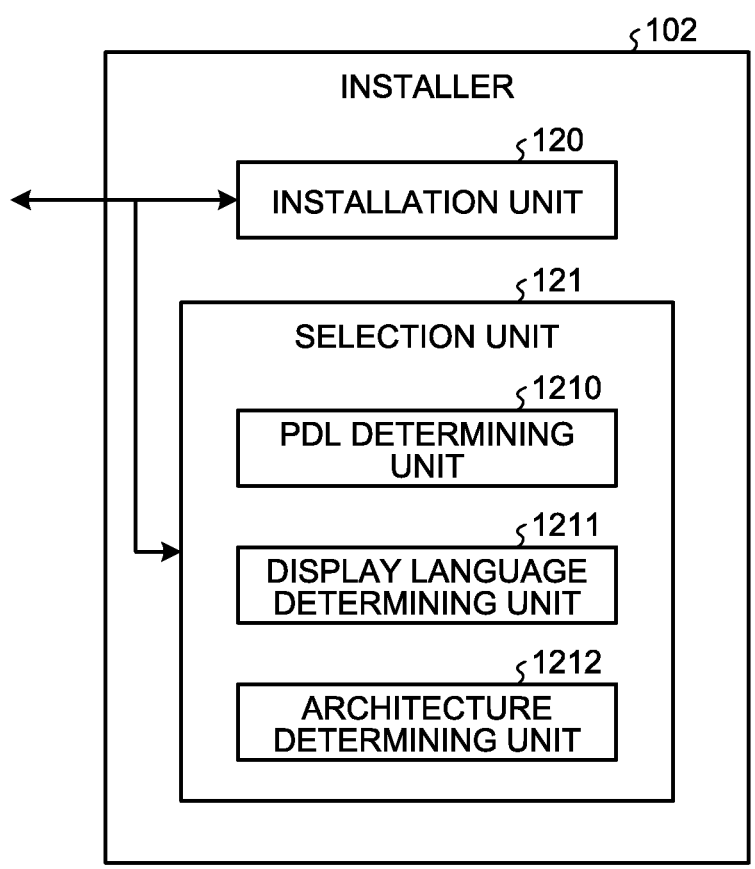
FIG. 7 is an exemplary functional block diagram for explaining functions of an installer according to the first embodiment.

FIG. 7 is an exemplary functional block diagram for explaining functions of the installer 102 according to the first embodiment. The installer 102 includes an installation unit 120 and a selection unit 121. The selection unit 121 includes a PDL determining unit 1210, a display language determining unit 1211, and an architecture determining unit 1212.

The installation unit 120 installs a driver program in the PC 10. The selection unit 121 determines the order of the attribute information acquired from the server 30 on the basis of the priority order determined in advance for each piece of attribute information. The selection unit 121 then selects a driver program to be installed on the basis of the determination result.

More specifically, the selection unit 121 includes the PDL determining unit 1210, the display language determining unit 1211, and the architecture determining unit 1212. The PDL determining unit 1210 includes information indicating the priority order that is determined in advance for the types of page description language (PDL), and performs determination processing on the basis of the priority order. For example, the information indicating the priority order may be embedded in a program for implementing the installer 102 that includes the PDL determining unit 1210. The information indicating the priority order may also be provided as independent data together with the installer 102, and stored in the storage 1005 or the like.

The display language determining unit 1211 determines display language of the driver program to be installed on the basis of the display language in which the operating system (OS) of the PC 10 currently performs the display. The architecture determining unit 1212 determines the architecture of the driver program to be installed on the basis of the information on the OS of the PC 10.

In the PC 10, an information processing program for implementing the functions according to the first embodiment is recorded in a computer-readable recording medium such as a compact disc (CD), a flexible disk (FD), and a digital versatile disc (DVD) in an installable or executable file format to provide the information processing program. However, this is not essential, and the information processing program may be stored in a computer connected to a network such as the Internet, and downloaded via the Internet to provide the information processing program. The information processing program may also be provided or distributed via a network such as the Internet.

The information processing program has a modular configuration including the units described above (control unit 100, communication unit 101, installer 102, display unit 103, and input unit 104). As actual hardware, the CPU 1000 reads out the information processing program from the storage medium such as the storage 1005, and executes the information processing program. Consequently, the units described above are loaded on a main storage device such as the RAM 1002, and the control unit 100, the communication unit 101, the installer 102, the display unit 103, and the input unit 104 are generated on the main storage device.

Figure 8:
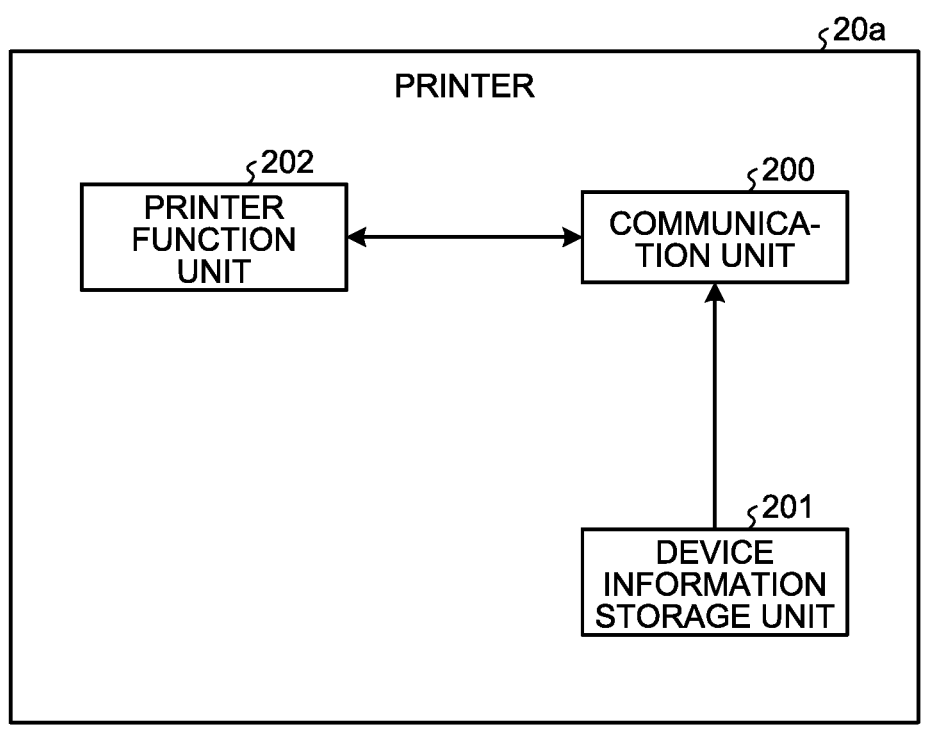
FIG. 8 is an exemplary functional block diagram for explaining functions of a printer applicable to the first embodiment.

FIG. 8 is an exemplary functional block diagram for explaining functions of the printer 20a applicable to the first embodiment. The printer 20a includes a communication unit 200, a device information storage unit 201, and a printer function unit 202. The communication unit 200, the device information storage unit 201, and the printer function unit 202 are implemented using the programs that run on the CPU 2000. However, this is not essential, and a part or all of the communication unit 200, the device information storage unit 201, and the printer function unit 202 may be constructed by hardware circuits that operate in cooperation with one another.

The communication unit 200 controls communication by the data I/F 2007 and the communication I/F 2008. The device information storage unit 201 controls the reading out of the identification information (such as a PnP device ID) of the printer 20a and information indicating the destination of the printer 20a that are stored in advance in a register included in the communication I/F 2008 or the ROM 2001. The destination is an area set as a shipping destination of the printer 20a, and for example, may be "domestic" or "overseas". The destination relates to the default language used by the printer 20a. The printer function unit 202 controls a printing function of the printer 20a.

Figure 9:
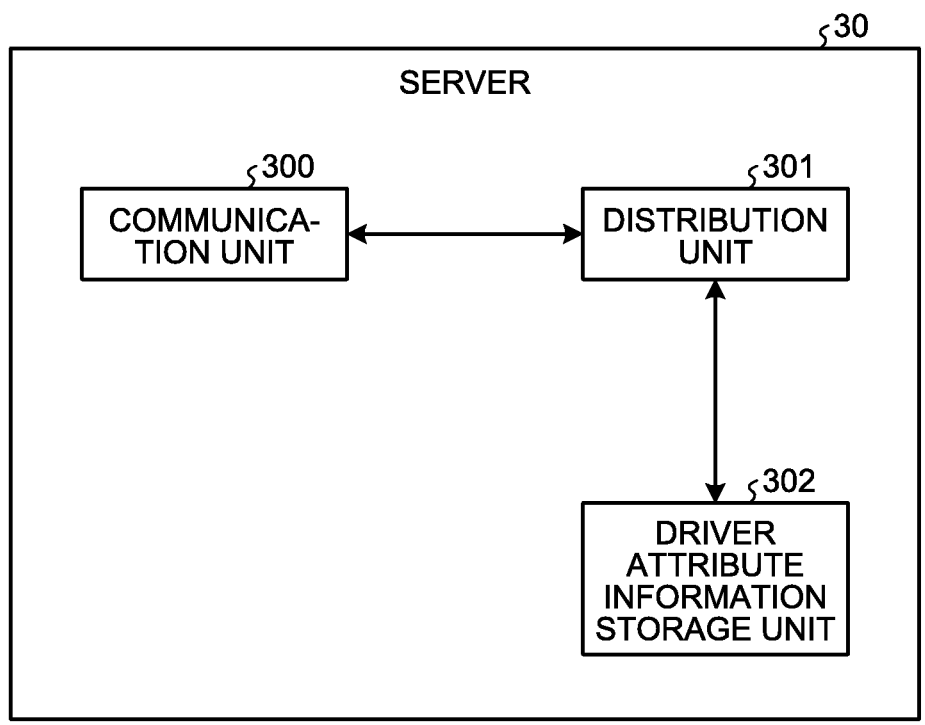
FIG. 9 is an exemplary functional block diagram for explaining functions of a server applicable to the first embodiment.

FIG. 9 is an exemplary functional block diagram for explaining functions of the server 30 applicable to the first embodiment. The server 30 includes a communication unit 300, a distribution unit 301, and a driver attribute information storage unit 302. The communication unit 300, the distribution unit 301, and the driver attribute information storage unit 302 are implemented using the programs that run on the CPU 3000. However, this is not essential, and a part or all of the communication unit 300, the distribution unit 301, and the driver attribute information storage unit 302 may be constructed by hardware circuits that operate in cooperation with one another.

The communication unit 300 controls communication by the communication I/F 3004. For example, the driver attribute information storage unit 302 controls the reading out of the attribute information of the driver programs that are stored in the storage 3003. The distribution unit 301 requests attribute information of the driver program from the driver attribute information storage unit 302 on the basis of the request received by the communication unit 300. The distribution unit 301 then transmits the attribute information received from the driver attribute information storage unit 302, from the communication unit 300. Also, when the main body of the driver program is stored in the storage 3003, the distribution unit 301 requests the driver program from the driver attribute information storage unit 302 on the basis of the request received by the communication unit 300. The distribution unit 301 then transmits the driver program received from the driver attribute information storage unit 302, from the communication unit 300.

Table 1 is an example of attribute information of the driver program that is to be stored in the storage 3003 of the server 30, for example. In Table 1, attribute information of a single driver program is described per line. The attribute information includes items of "identification information", "driver architecture", "PDL", "display language", "version", and "acquisition information". Each piece of attribute information is differentiated by a combination of the items. In other words, a plurality of pieces of attribute information having the same content regarding each item may exist.

TABLE 1

| Identification Information | Driver Architecture | PDL | Display Language | Version | Acquisition Information |
|---|---|---|---|---|---|
| Printer #A | High performance | PDL #1 | Japanese, English | 1.0.0.0 | (URL) |
| Printer #A | Medium performance, 64 bit | PDL #1 | Japanese, English | 1.0.0.0 | (URL) |
| Printer #A | Medium performance, 32 bit | PDL #1 | Japanese, English | 1.0.0.0 | (URL) |
| Printer #A | Medium performance, 64 bit | PDL #2 | Japanese, English | 1.0.0.0 | (URL) |
| Printer #A | Medium performance, 32 bit | PDL #2 | Japanese, English | 1.0.0.0 | (URL) |
| Printer #A | Medium performance, 64 bit | PDL #3 | Japanese, English | 1.0.0.0 | (URL) |
| Printer #A | Medium performance, 32 bit | PDL #3 | Japanese, English | 1.0.0.0 | (URL) |
| Printer #B | Medium performance, 64 bit | PDL #2 | Japanese, English | 1.0.0.0 | (URL) |
| Printer #B | Medium performance, 32 bit | PDL #2 | Japanese, English | 1.0.0.0 | (URL) |
| Printer #B | Medium performance, 64 bit | PDL #3 | Japanese, English | 1.0.0.0 | (URL) |
| Printer #B | Medium performance, 32 bit | PDL #3 | Japanese, English | 1.0.0.0 | (URL) |
| Printer #C | Medium performance, 64 bit | PDL #1 | Japanese | 1.1.0.0 | (URL) |
| Printer | Medium | PDL | Japanese | 1.1.0.0 | (URL) |

TABLE 1-continued

| Identification Information | Driver Architecture | PDL | Display Language | Version | Acquisition Information |
|---|---|---|---|---|---|
| #C | performance, 32 bit | #1 | | | |
| Printer #C | Medium performance, 64 bit | PDL #1 | English | 1.1.0.0 | (URL) |
| Printer #C | Medium performance, 32 bit | PDL #1 | English | 1.1.0.0 | (URL) |

In Table 1, the item "identification information" is identification information for identifying the model of a device supported by the driver program of the attribute information in the line, and for example, a PnP device ID may be used. In the example in Table 1, values of the item "identification information" are exemplified by printer models "printer #A", "printer #B", and "printer #C".

The item "driver architecture" is architecture of the driver program. The architecture of the driver program indicates the structure of the driver program. In the example in Table 1, the item "driver architecture" includes a value indicating whether the driver program runs on a 32-bit OS or a 64-bit OS, and a value indicating the performance of the driver architecture (high performance or medium performance).

Whether the driver program in high performance driver architecture or medium performance driver architecture (respectively referred to as a high performance driver and a medium performance driver) is applicable to the PC 10 depends on the OS version of the PC 10, for example. For example, a driver program in high performance driver architecture is compatible with the OS of a certain version or later.

As the value indicating the performance, version information of the driver architecture itself can be used, for example. For example, when the OS of the driver program is Windows (registered trademark), the driver architecture of version 4 (V4) or version 3 (V3) may be applied. The V4 can provide a driver program with higher performance than the V3. In this example, the V4 is compatible with Windows 8 (registered trademark) OS and later versions, and the V3 is compatible with Windows 2000 (registered trademark) OS and later versions.

The item "PDL" is a type of PDL used by the driver program. In the example in Table 1, values of the item "PDL" include PDL types "PDL #1", "PDL #2", and "PDL #3".

The PDL is page description language, and is language according to which image information, character information and/or the like that are created by a computer and/or the like is converted to a format interpretable and printable by the printer. In other words, the PDL is a command type, a command format, or a command set for the printer. The concept of the PDL may be extended to command language, a command type, a command format, and a command set for external devices other than the printer that are controlled by the computer. Typical examples of the PDL type include Refined Printing Command Stream (RPCS), Printer Command Language 6 (PCL 6), and PostScript (PS:registered trademark).

In this example, it is assumed that the printer of the model type "printer #A" can achieve the highest performance or the largest number of functions when a printer driver corresponding to the PDL type "PDL #1" among the PDL types "PDL #1", "PDL #2", and "PDL #3" is used, and the performance of the printer is limited, the limitation increasing in the order of the PDL types "PDL #2" and "PDL #3". Similarly, it is assumed that the printer of the model "printer #B" can achieve the highest performance or the largest number of functions when the printer driver corresponding to the PDL type "PDL #2" is used, and the performance of the printer is limited when the PDL type "PDL #3" is used, and the printer does not support the PDL type "PDL #1". Furthermore, it is assumed that the printer of the model "printer #C" supports to the PDL type "PDL #1" among the PDL types "PDL #1", "PDL #2", and "PDL #3", and does not support the other PDL types.

The item "display language" is display language of the OS of the driver program. In the example in Table 1, values of the item "display language" include "Japanese" and "English". The item "version" includes a value indicating the version information of the driver program.

The item "acquisition information" is information for acquiring the driver program. Regarding the item "acquisition information", as the information for acquiring the driver program, an URL indicating the position of the driver program on the Internet, on the network 40, or on the server 30 connected to the network 40 described above can be used, for example.

Figure 10:
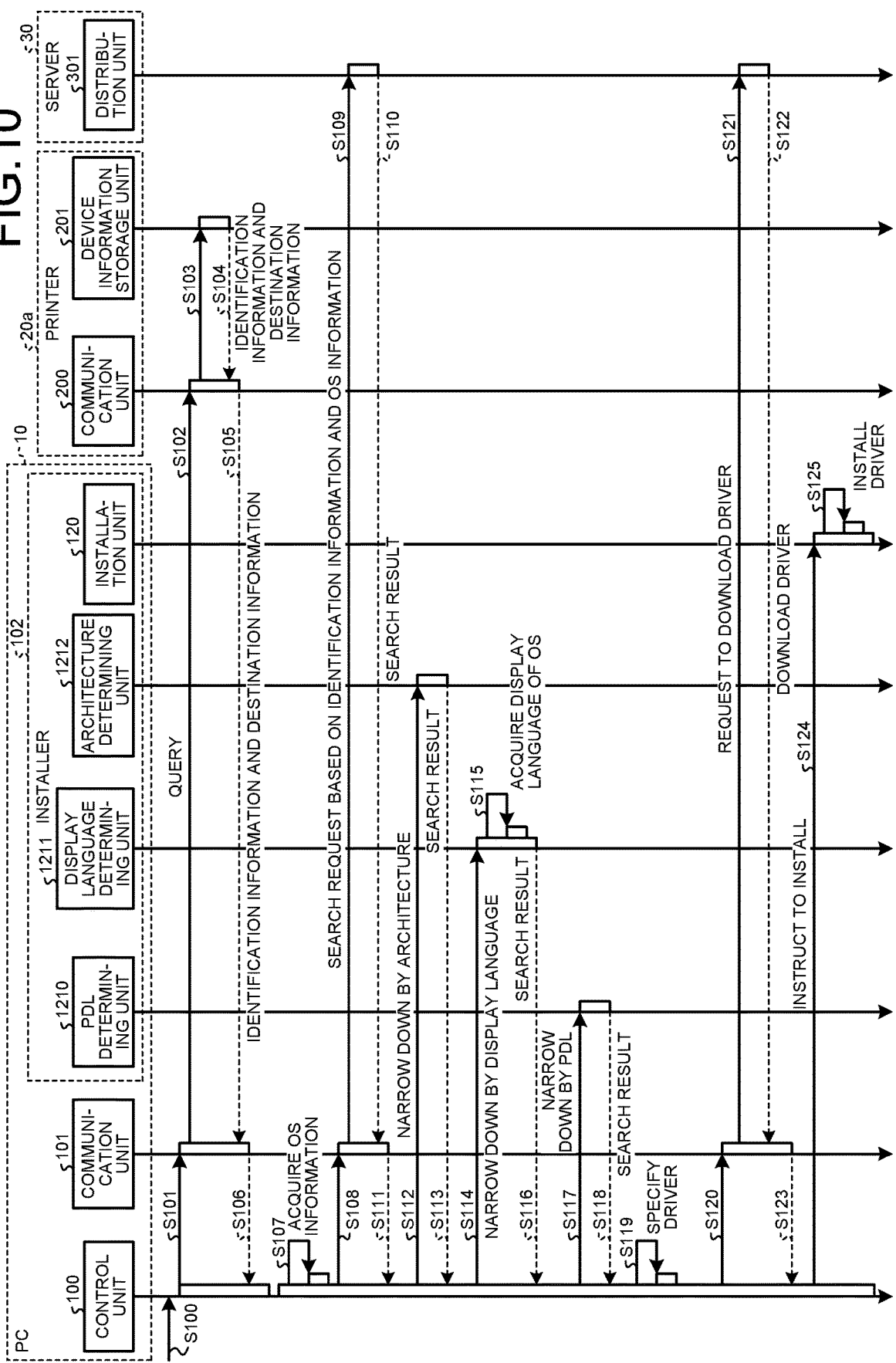
FIG. 10 is an exemplary sequence diagram illustrating a flow of installing a driver program in the PC according to the first embodiment.

Next, installation of the driver program in the PC 10 according to the first embodiment will be described in more detail. FIG. 10 is an exemplary sequence diagram illustrating a flow of installing a driver program in the PC 10 according to the first embodiment. In FIG. 10, portions corresponding to the portions in FIG. 6 to FIG. 9 described above are denoted by the same reference numerals, and the detailed description thereof will be omitted.

For example, a user operates the PC 10 and gives an instruction to install a driver program (step S100). The operation performed by the user is received by the input unit 104 in the PC 10, and is transmitted to the control unit 100. Based on the received instruction, the control unit 100 make a query to request the identification information and the destination information indicating the destination of the printer 20*a* from the printer 20*a*, via the communication unit 101 (step S101 and step S102). The query is received by the communication unit 200 of the printer 20*a*, and is transmitted to the device information storage unit 201 (step S103).

When the query of the identification information to the printer 20*a* is made via the network 40, the identification information may be acquired from an object identifier (OID) in a management information base (MIB) in a simple network management protocol (SNMP). Also, a technique of transmitting a printer job language (PJL) command to the printer 20*a* from the PC 10, and acquiring identification information on the basis of the response when the printer 20*a* is connected to the PC 10 via an USB as in the case of the printer 20*b* has been known.

For example, the device information storage unit 201 reads out the identification information and the destination information stored in advance, from the register of the communication I/F 2008 and the ROM 2001. The identification information and the destination information read out by the device information storage unit 201 are transmitted to the PC 10 via the communication unit 200 (step S104 and step S105). The identification information and the destination information transmitted from the printer 20*a* are received by the communication unit 101 in the PC 10, and are transmitted to the control unit 100 (step S106). In other words, the control unit 100 also functions as an identification information acquisition unit that acquires identification information for identifying the model of the printer 20a.

The control unit 100 acquires information on the OS of the PC 10 (hereinafter, OS information) at step S107. The OS information to be acquired includes at least OS version information indicating the version of the OS and information indicating the architecture whether the OS is a 32-bit OS or a 64-bit OS.

Next, based on the identification information of the printer 20a acquired at step S106 and the OS information acquired at step S107, the control unit 100 transmits a search request to the server 30 via the communication unit 101, to request to search for attribute information of the driver program corresponding to the identification information and the OS information (step S108 and step S109).

FIG. 11 is an example of the search request transmitted from the control unit 100 to the server 30 at step S108 and step S109 that is applicable to the first embodiment. As illustrated in FIG. 11, for example, the search request is obtained by adding identification information ("PrinterA") and the OS information ("32 bit") that are searching conditions in a search command, to the URL of the search destination of the server 30 and a search request command ("https://1.example.com/Sreach/Web?Query"), as arguments. The OS information may explicitly indicate OS version information and OS name. When the applicable OS is limited in advance, it is possible to specify the OS by simply designating the information indicating the architecture of the OS ("32 bit") as illustrated in FIG. 11.

The search request transmitted from the PC 10 at step S109 is received by the communication unit 300 in the server 30. For example, the communication unit 300 transmits the received search request to the distribution unit 301. Based on the search command included in the search request that is received from the communication unit 300, the distribution unit 301 transmits the search condition to the driver attribute information storage unit 302. The distribution unit 301 then requests the driver attribute information storage unit 302 to search for the attribute information of the driver program that matches with the search condition. In response to the request, the driver attribute information storage unit 302 searches the stored attribute information for the attribute information of the driver program that matches with the search condition (in this example, the identification information and the OS information) received from the distribution unit 301 and transmits the attribute information acquired as the search result, to the distribution unit 301 as a list.

The distribution unit 301 transmits the list of attribute information received from the driver attribute information storage unit 302, as the search result in response to the search request, to the PC 10 via the communication unit 300 (step S110). The search result transmitted from the server 30 is received by the communication unit 101 in the PC 10, and is transmitted to the control unit 100 (step S111). In other words, the control unit 100 also functions as an attribute information acquisition unit for acquiring attribute information of the driver program corresponding to the model of the printer 20a and the OS information of the PC 10.

FIG. 12 is an example of a search result transmitted from the server 30 applicable to the first embodiment. In FIG. 12, unless otherwise specified, the numerals at the beginning of the lines each indicates a line number, and the subsequent colon (:) differentiates the line number from a code indicating the data main body. The codes illustrated in FIG. 12 are described using Extensible Markup Language (XML) that is a type of markup language used to define and describe the meaning and structure of data, using a tag. It is to be noted that this is merely an example, and the description method of the search result is not particularly limited. For example, the search result can be described in JavaScript (registered trademark) Object Notation (JSON) or in a binary format.

In FIG. 12, the first line defines the XML version and an encode method according to which the data is described. The search result is described in the third line between a start tag "<Software>" in the second line and an end tag "</Software>" in the fourth line. In the search result, the attribute information corresponding to a single driver program is described between a pair of characters "<" and ">". In the example illustrated in FIG. 12, in the third line, values respectively corresponding to the items "identification information", "driver architecture", "PDL", "display language", "version", and "acquisition information" of the attribute information explained in Table 1 are described as the "Driver name", "DriverArchitecture", "PDL", "language", "version" and "DownloadURL" subsequent to the character "<", and are finished by the character ">".

It is possible to form a search result including a plurality of pieces of attribute information, by including the plurality of pieces of attribute information each interposed between the pair of characters "<" and ">", between the start tag "<Software>" and the end tag "</Software>".

Based on the search result (list of attribute information) received from the communication unit 101 at step S111, the control unit 100 performs the following processes from step S112 to step S118 to specify the driver program to be installed in the PC 10.

First, at step S112 and step S113, the control unit 100 narrows down the driver programs by architecture. At step S112, the control unit 100 transmits the search result acquired at step S111 to the installer 102, and instructs the installer 102 to narrow down the driver programs by architecture. Following the instruction, the architecture determining unit 1212 in the installer 102 extracts the attribute information corresponding to a driver program as a candidate to be installed from the pieces of attribute information included in the search result on the basis of the information indicated by the item "driver architecture" in the received search result, and the OS information of the PC 10 acquired by the control unit 100 at step S107.

Figure 13:
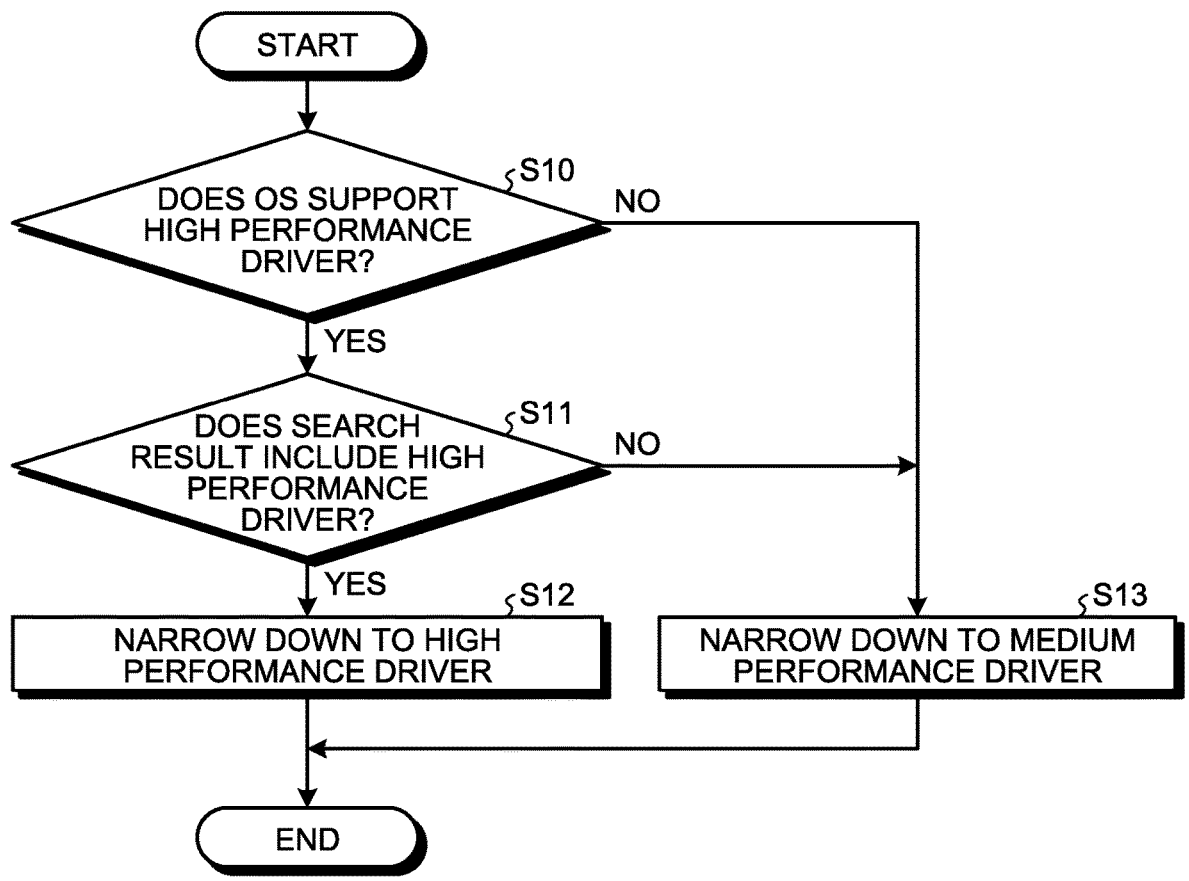
FIG. 13 is a flowchart illustrating an example of a determination process performed by an architecture determining unit according to the first embodiment.

FIG. 13 is a flowchart illustrating an example of a determination process performed by the architecture determining unit 1212 according to the first embodiment. At step S10, the architecture determining unit 1212 determines whether the OS of the PC 10 supports the high performance driver on the basis of the OS information. For example, it is assumed that a certain version of the OS (such as the latest version OS at the point when the high performance driver is developed) supports the high performance driver, and the architecture determining unit 1212 determines whether the OS version information in the OS information indicates the certain version. When it is determined that the OS supports the high performance driver ("Yes" at step S10), the architecture determining unit 1212 moves the process to step S11.

At step S11, the architecture determining unit 1212 determines whether a value indicating the high performance driver is included in the item "driver architecture" in the pieces of attribute information included in the list of attribute information being the search result. When it is determined that the value indicating the high performance driver is included in the item "driver architecture" ("Yes" at step S11), the architecture determining unit 1212 moves the process to step S12.

At step S12, the architecture determining unit 1212 narrows down the driver program to be installed, to the high performance driver. More specifically, the architecture determining unit 1212 extracts the pieces of attribute information in which the value of the item "driver architecture" is the "high performance", among the pieces of attribute information included in the list of attribute information acquired at step S112. The architecture determining unit 1212 then transmits the extracted pieces of attribute information to the control unit 100 as the search result (step S113 in FIG. 10), and finishes the series of processes illustrated in the flowchart of FIG. 13.

When it is determined that the OS of the PC 10 does not support the high performance driver at step S10 described above ("No" at step S10), or when it is determined that the search result does not include the high performance driver at step S11 ("No" at step S11), the architecture determining unit 1212 moves the process to step S13. At step S13, the architecture determining unit 1212 extracts pieces of attribute information in which the value of the item "driver architecture" is the "medium performance", among the pieces of attribute information included in the list of attribute information acquired at step S112.

The architecture determining unit 1212 then transmits the extracted pieces of attribute information to the control unit 100 as the search result (step S113 in FIG. 10), and finishes the series of processes illustrated in the flowchart of FIG. 13.

The architecture determining unit 1212 may further use the information indicating whether the OS is a 32-bit OS or a 64-bit OS on the basis of the OS information, in the processes illustrated in the flowchart of FIG. 13 to perform each determination. For example, when the OS information indicates the 32-bit OS, while the 64-bit OS supports the high performance driver but the 32-bit OS does not support the high performance driver, the architecture determining unit 1212 determines that the OS does not support the high performance driver at step S10 ("No" at step S10). Also, at step S13, when the driver to be installed is narrowed down to the medium performance driver, the architecture determining unit 1212 further narrows down the medium performance driver on the basis of the OS information indicating the 32-bit OS or the 64-bit OS.

Returning to the explanation in FIG. 10, the control unit 100 then narrows down the driver program by the display language, from step S114 to step S116. At step S114, based on the processes illustrated in the flowchart of FIG. 13 described above, the control unit 100 transmits the search result that is received at step S113 and the destination information acquired at step S106, to the installer 102, and instructs the installer 102 to narrow down the driver program by the display language. In response to the instruction, the display language determining unit 1211 in the installer 102 acquires display language (Japanese, English, and the like) that is currently set, from the OS of the PC 10 (step S115). The display language determining unit 1211 then extracts attribute information corresponding to a driver program as a candidate to be installed, from the pieces of attribute information included in the search result on the basis of the information indicated in the item "display language" in the received search result, and the display language acquired by the control unit 100 at step S115.

Figure 14:
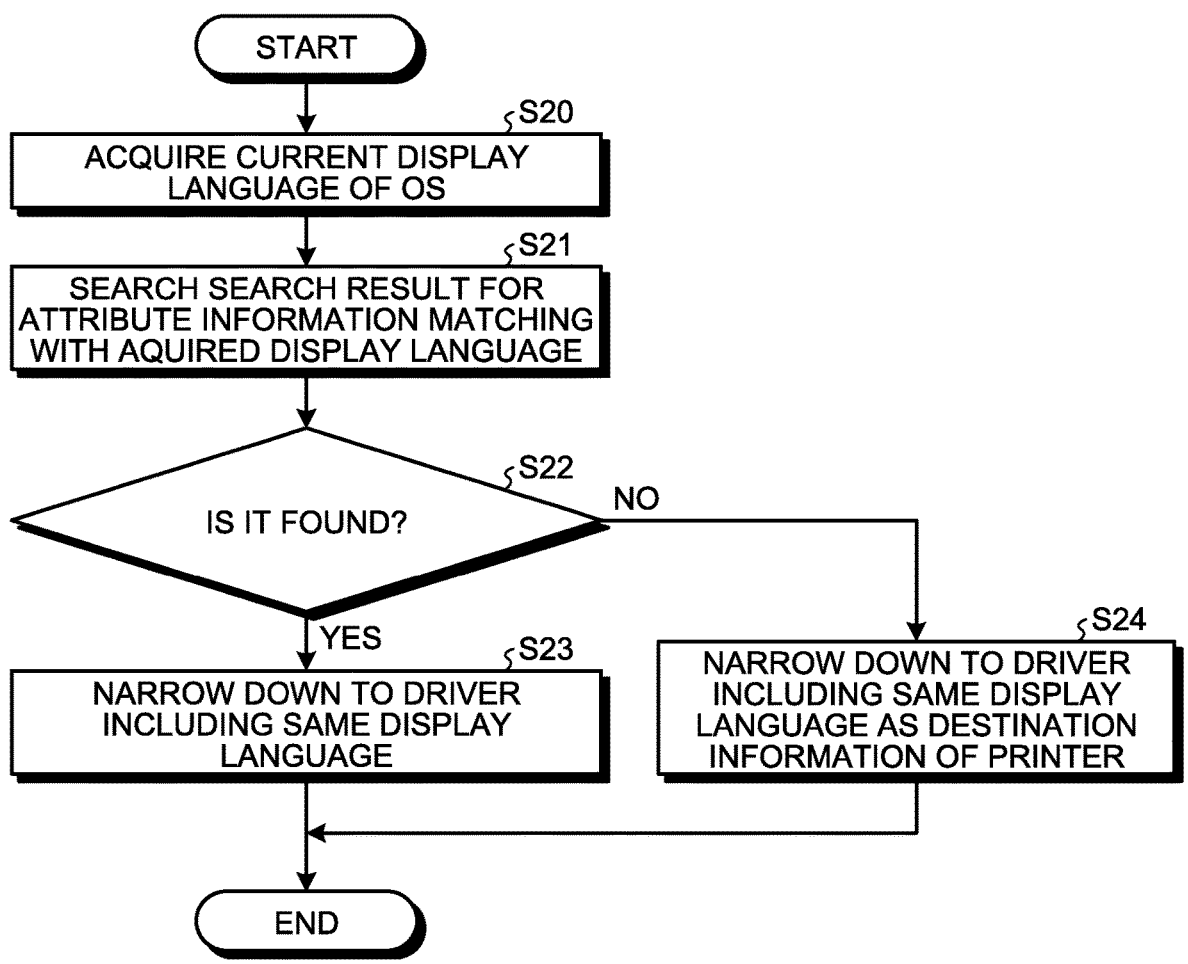
FIG. 14 is a flowchart illustrating an example of a determination process performed by a display language determining unit according to the first embodiment.

FIG. 14 is a flowchart illustrating an example of a determination process performed by the display language determining unit 1211 according to the first embodiment. At step S20, the display language determining unit 1211 acquires display language that is currently set in the OS of the PC 10 (step S115 in FIG. 10). For example, when the OS is Windows (registered trademark), the display language of the OS can be acquired using the function "GetUserDefaultUIlanguage( )" included in Windows (registered trademark) application programming interface (API).

At the next step S21, the display language determining unit 1211 searches the pieces of attribute information included in the search result that are received from the control unit 100 for attribute information in which the value of the item "display language" matches with the display language acquired at step S20. At the next step S22, the display language determining unit 1211 determines whether the relevant attribute information is found as a result of the search. When it is determined that the relevant attribute information is found ("Yes" at step S22), the display language determining unit 1211 moves the process to step S23.

At step S23, the display language determining unit 1211 narrows down the driver program to be installed on the basis of the search result at step S21. More specifically, the display language determining unit 1211 transmits the pieces of attribute information in which the display language acquired at step S20 is included as the value of the item "display language", among the pieces of attribute information that are included in the list of attribute information as the search result acquired at step S114, to the control unit 100 as the search result (step S116 in FIG. 10). The display language determining unit 1211 then finishes the series of processes illustrated in the flowchart of FIG. 14.

When it is determined that the relevant attribute information is not found at step S22 described above ("No" at step S22), the display language determining unit 1211 moves the process to step S24. At step S24, the display language determining unit 1211 acquires the destination information acquired by the control unit 100 at step S106 in FIG. 10, from the installer 102. Then, the display language determining unit 1211 transmits the pieces of attribute information in which the value of the item "display language" corresponds to the destination information, among the pieces of attribute information included in the search result acquired at step S114, to the control unit 100 as the search result (step S116 in FIG. 10). The display language determining unit 1211 then finishes the series of processes illustrated in the flowchart of FIG. 14.

As described above, the destination information is information indicating an area such as "domestic" and "overseas" that is set as the shipping destination of the printer 20a. For example, it is assumed that the display language determining unit 1211 holds in advance a table indicating the relation between information on the area indicated in the destination information and default language of the printer 20a that is set for the area. In this table, for example, a value "ja" indicating Japanese is associated with the value "domestic" of the destination information, and a value "en" indicating English is associated with the value "overseas" of the destination information, as values indicating the default language.

The display language determining unit 1211 transmits the pieces of attribute information in which the value of the item "display language" matches or corresponds to the language that indicates the value of the default language associated with the value of the destination information of the printer 20a, among the pieces of attribute information included in the search result, to the control unit 100 as the search result.

Returning to the explanation in FIG. 10, the control unit 100 then narrows down the driver program by the PDL at step S117 and step S118. At step S117, the control unit 100 transmits the search result that is received at step S116 on the basis of the processes illustrated in the flowchart of FIG. 14 to the installer 102, and instructs the installer 102 to narrow down the driver program by the PDL. In response to the instruction, the PDL determining unit 1210 in the installer 102 determines the value of the item "PDL" in the pieces of attribute information included in the search result on the basis of the priority order.

As described above, the PDL determining unit 1210 includes information indicating the priority order that is determined in advance for the types of PDL. In this example, it is assumed that the priority order of the PDL types "PDL #1", "PDL #2", and "PDL #3" indicated in the item "PDL" in Table 1 described above is "PDL #1">"PDL #2">"PDL #3". The PDL type "PDL #1" has the highest priority order, and the PDL type "PDL #3" has the lowest priority order.

For example, in the priority order set for the PDL types, the PDL type that is formed by the supply source of the information processing program according to the first embodiment and that has the highest performance, is set to have the highest priority. For example, in the information processing program provided by the manufacturer of the printer 20a, the PDL type that can achieve the highest performance or the largest number of functions by the printer 20a is set to have the highest priority order. For example, the printer 20a can achieve the highest performance and the largest number of functions, by applying the PDL developed by the manufacturer of the printer 20a.

Regarding the other PDL types, the lower priority order is set as the performance of the printer 20a is lower with respect to the PDL type of the highest priority PDL when the PDL type is applied to the printer 20a, for example. For example, the other PDL type may be a standard PDL type that is compatible with the printer 20a as well as the printer provided by the other manufacturer different from the manufacturer of the printer 20a.

For example, among the PDL types of the RPCS, the PCL 6, and the PS described above, it is assumed that the printer 20a can achieve the highest performance and the largest number of functions, when a driver program corresponding to the PDL type "RPCS" is applied to the printer 20a. In this case, for example, the priority order of the PDL type "PROS" may be set highest for the model of the printer 20a, and the priority order of the other PDL types "PCL 6" and "PS" may be set lower than the priority order of the PDL type "PRCS".

It is to be noted that the setting rule of the priority order for the PDL types is not limited thereto.

Figure 15:
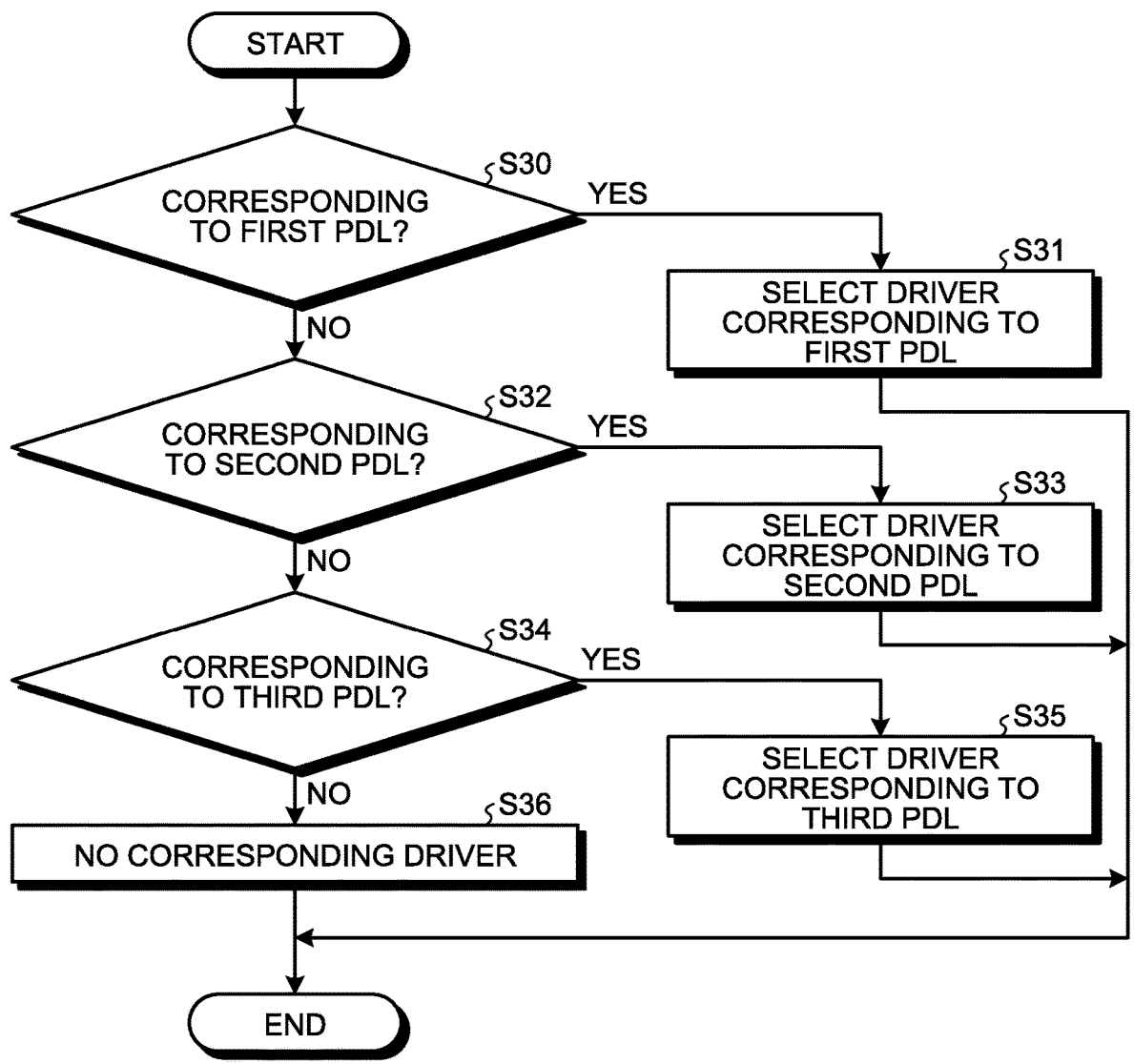
FIG. 15 is a flowchart illustrating an example of a determination process performed by a PDL determining unit according to the first embodiment.

FIG. 15 is a flowchart illustrating an example of a determination process performed by the PDL determining unit 1210 according to the first embodiment. In the following, the PDL types "PDL #1", "PDL #2", and "PDL #3" described above are suitably referred to as PDL types "first PDL", "second PDL", and "third PDL" in descending order from the highest priority.

In FIG. 15, at step S30, the PDL determining unit 1210 determines whether at least one of the pieces of attribute information in the search result corresponds to the PDL type "first PDL" with the highest priority order. More specifically, the PDL determining unit 1210 determines whether there is the attribute information in which the value of the item "PDL" indicates the PDL type "first PDL", among the pieces of attribute information in the search result.

When it is determined that there is the attribute information corresponding to the PDL type "first PDL" ("Yes" at step S30), the PDL determining unit 1210 moves the process to step S31. At step S31, based on the determination result at step S30, the PDL determining unit 1210 selects the driver program corresponding to the attribute information that is associated with the PDL type "first PDL", among the pieces of attribute information in the search result, as the driver program to be installed. The PDL determining unit 1210 then transmits the attribute information of the selected driver program to the control unit 100 as the search result (step S118 in FIG. 10). The PDL determining unit 1210 then finishes the series of processes illustrated in the flowchart of FIG. 15.

At this stage, the pieces of attribute information corresponding to the identification information is narrowed down by the values of the items "driver architecture" and "display language", by the processes illustrated in the flowcharts of FIG. 13 and FIG. 14 described above. Thus, a single driver program is selected as the driver program to be installed.

When it is determined that there is no attribute information corresponding to the PDL type "first PDL" at step S30 ("No" at step S30), the PDL determining unit 1210 moves the process to step S32. At step S32, the PDL determining unit 1210 determines whether at least one of the pieces of attribute information in the search result corresponds to the PDL type "second PDL" with the next highest priority order after the PDL type "first PDL".

When it is determined that there is attribute information corresponding to the PDL type "second PDL" ("Yes" at step S32), the PDL determining unit 1210 moves the process to step S33. At step S33, based on the determination result at step S32, the PDL determining unit 1210 selects the driver program corresponding to the attribute information that is associated with the PDL type "second PDL", among the pieces of attribute information in the search result, as the driver program to be installed. The PDL determining unit 1210 then transmits the attribute information of the selected driver program to the control unit 100 as the search result (step S118 in FIG. 10). The PDL determining unit 1210 then finishes the series of processes illustrated in the flowchart of FIG. 15.

When it is determined that there is no attribute information corresponding to the PDL type "second PDL" at step S32 ("No" at step S32), the PDL determining unit 1210 moves the process to step S34. At step S34, the PDL determining unit 1210 determines whether at least one of the pieces of attribute information in the search result corresponds to the PDL type "third PDL" with the next highest priority order after the PDL type "second PDL".

When it is determined that there is the attribute information corresponding to the PDL type "third PDL" ("Yes" at step S34), the PDL determining unit 1210 moves the process to step S35. At step S35, based on the determination result at step S34, the PDL determining unit 1210 selects the driver program corresponding to the attribute information that is associated with the PDL type "third PDL", among the pieces of attribute information in the search result, as the driver program to be installed. The PDL determining unit 1210 then transmits the attribute information of the selected driver program to the control unit 100 as the search result (step S118 in FIG. 10). The PDL determining unit 1210 then finishes the series of processes illustrated in the flowchart of FIG. 15.

At step S34, when it is determined that there is no attribute information corresponding to the PDL type "third PDL" ("No" at step S34), the PDL determining unit 1210 moves the process to step S36. At step S36, the PDL determining unit 1210 determines that there is no driver program corresponding to the identification information acquired at step S105 and step S106 in FIG. 10, and finishes the series of processes illustrated in the flowchart of FIG. 15. In this case, for example, the PDL determining unit 1210 may notify the control unit 100 that there is no corresponding driver program.

In FIG. 15, the PDL types to be determined are three types, and the PDL is determined in three stages at step S30, step S32, and step S34. However, this is not essential. In other words, in the flowchart illustrated in FIG. 15, a set of the process of determining whether the attribute information corresponds to the PDL type on the basis of the priority order (such as step S30), and the process of selecting the driver program corresponding to the attribute information that is associated with the PDL type as the driver program to be installed (such as step S31), may be repeated on the basis of the number of the PDL type to be determined. Consequently, the determination process may be similarly executed on the PDL types of four or more or on the PDL types of two or less.

The explanation returns to FIG. 10, and the control unit 100 specifies the driver program to be installed on the basis of the search result acquired from the PDL determining unit 1210 at step S118 (step S119). The control unit 100 then extracts a value (URL) of the item "acquisition information" from the attribute information being the search result acquired from the PDL determining unit 1210, and requests to download (DL) the driver program using the extracted URL as the address (step S120 and step S121). In the example in FIG. 10, it is assumed that the server 30 stores therein the driver program, and the URL indicates the position where the driver program is stored in the server 30.

The server 30 transmits the driver program stored at the URL to the PC 10, in response to the download request from the control unit 100 (step S122). In the PC 10, the communication unit 101 receives the driver program having been transmitted and downloaded from the server 30, and transmits the received driver program to the control unit 100 (step S123). In other words, the control unit 100 also functions as a program acquisition unit that acquires a driver program on the basis of the acquisition information.

The control unit 100 instructs the installation unit 120 to install the downloaded driver program in the PC 10 (step S124). Following the instruction, the installation unit 120 installs the driver program in the PC 10 (step S125).

The process of narrowing down the driver program from step S112 to step S118 described above, will now be described in more detail with reference to Table 1. In this example, the driver program of the printer 20*a* is to be installed, and it is assumed that the identification information acquired by the control unit 100 at step S106 indicates the model "printer #A", and the destination of the printer 20*a* is "Japan". Also, in the PC 10, it is assumed that the display language of the OS is "Japanese", the 32-bit OS is used, and the version of the OS is a version different from the certain version corresponding to a high performance driver.

First, from step S101 to step S111, the control unit 100 acquires identification information and destination information from the printer 20*a*, and on the basis of the identification information, the control unit 100 acquires attribute information corresponding to the identification information, from the server 30. In the example in Table 1, seven pieces of attribute information from the first line to the seventh line (excluding the item name line; the same applies hereinafter), in which the value of the item "identification information" is the "printer #A", are to be acquired.

At step S112 and step S113, the control unit 100 narrows down the driver program by the driver architecture, for the acquired pieces of attribute information on the basis of the processes illustrated in the flowchart of FIG. 13, by the architecture determining unit 1212. In this example, the high performance driver is not supported by the OS of the PC 10 and the architecture of the OS is the 32-bit OS. Thus, the pieces of attribute information on the third line, the fifth line, and the seventh line in Table 1 are to be acquired as the search result.

Next, from step S114 to step S116, the control unit 100 narrows down the driver program by the display language of the OS, for the pieces of attribute information acquired as the search result at step S112 and step S113 on the basis of the processes illustrated in the flowchart of FIG. 14, by the display language determining unit 1211. In this example, the current display language of the OS is "Japanese". Thus, the pieces of attribute information that are narrowed down at step S112 and step S113 described above, in other words, the pieces of attribute information on the third line, the fifth line, and the seventh line in Table 1 are to be acquired as the search result without change.

Next, at step S117 and step S118, the control unit 100 determines the priority order of the item "PDL", for the pieces of attribute information acquired as the search result from step S114 to step S116 on the basis of the processes illustrated in the flowchart of FIG. 15, by the PDL determining unit 1210. In this example, the priority order of the PDL information is "PDL #1">"PDL #2">"PDL #3". Hence, among the pieces of attribute information that are narrowed down from step S114 to step S116 described above, in other words, among the pieces of attribute information on the third line, the fifth line, and the seventh line in Table 1, the attribute information on the third line in which the value of the item "PDL" is the value "PDL #1" indicating the highest priority order, is to be acquired as the search result.

Based on the URL indicated in the item "acquisition information" of the attribute information on the third line in Table 1 that is acquired as the search result, the control unit 100 downloads the driver program.

In this manner, in the first embodiment, for example, the driver program for using the printer 20*a* from the PC 10 is selected on the basis of the information acquired from the printer 20*a* and the OS information of the PC 10. Consequently, it is possible to automatically acquire the driver program that matches with the printer 20*a* and the PC 10, without the user explicitly designating the driver program.

Also, the priority order of the PDL types is determined in advance, and the driver program is sequentially selected from the PDL type with the higher priority order. Thus, it is possible to automatically acquire the driver program that can suitably use the function of the printer 20*a*, without the user explicitly designating the driver program.

Furthermore, the provider of the driver program does not need to designate the PDL to be preferentially installed for each model, even if the driver programs corresponding to the models each corresponds to a different PDL for each of the models. In other words, it is possible to install the driver program corresponding to the PDL suitable for each model, using the common installer.

In the first embodiment described above, as indicated from step S112 to step S118 in FIG. 10, the driver program is narrowed down by the driver architecture (step S112 and step S113), then narrowed down by the display language of the OS (step S114 to step S116), and finally narrowed down by the PDL type (step S117 and step S118). However, this is not essential. For example, either or both processes of narrowing down by the driver architecture at step S112 and S113, and narrowing down by the display language of the OS from step S114 to step S116 may be omitted.

In the above, the driver program is a printer driver program for controlling the printer. However, this is not essential. For example, a scanner driver program for controlling a scanner may be applied in the first embodiment. For example, when the OS is Windows (registered trademark), a typical scanner driver program is TWAIN and Windows (registered trademark) Image Acquisition (WIA). By setting the priority order on the information of the common items in the attribute information of the driver program, it is possible to similarly select and install a suitable driver program, as the printer driver described above.

Second Embodiment

Next, a second embodiment will be described. In the first embodiment described above, all the processes following the instruction of installing the driver program at step S100 in FIG. 10 have progressed automatically by the control unit 100. In the second embodiment, a user interface (UI) is provided for allowing the user to select the driver program to be installed.

Figure 16:
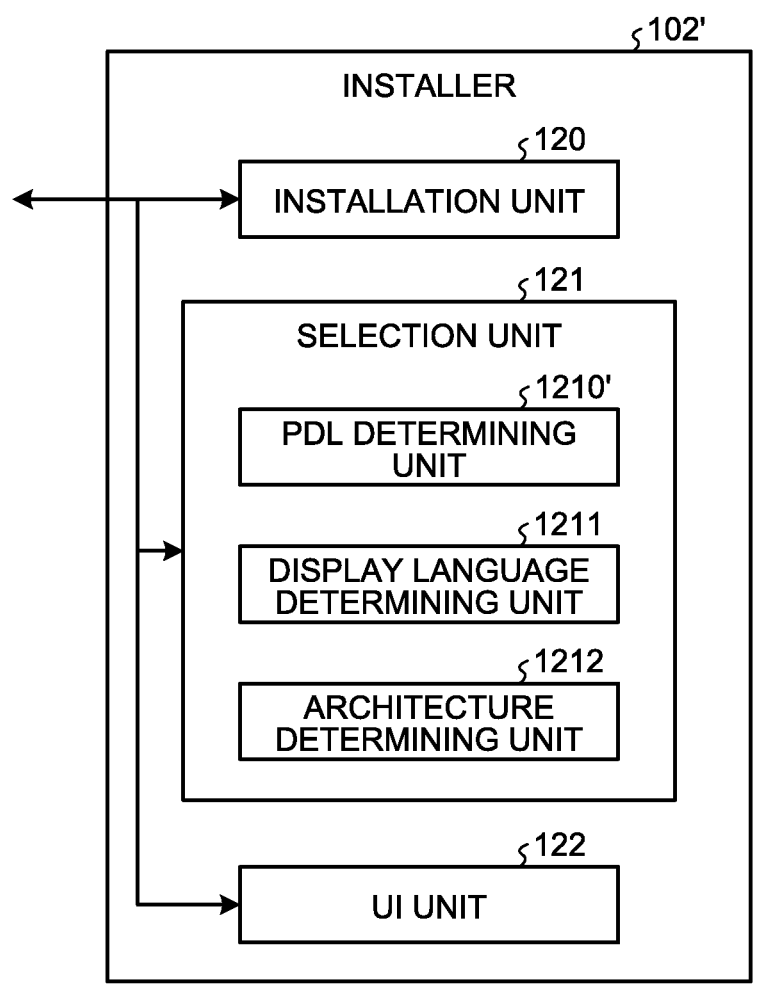
FIG. 16 is an exemplary functional block diagram for explaining functions of an installer according to a second embodiment.

FIG. 16 is an exemplary functional block diagram for explaining functions of an installer 102' according to the second embodiment. In FIG. 16, portions common with FIG. 7 described above are denoted by the same reference numerals, and the detailed description thereof will be omitted. In FIG. 16, the installer 102' further includes an UI unit 122 with respect to the installer 102 illustrated in FIG. 7. The UI unit 122 provides information to the user corresponding to the instruction by the control unit 100, generates a display screen to urge the user to operate, and causes the display unit 103 to display the display screen. The UI unit 122 also receives the user operation performed on the generated display screen via the input unit 104, and transmits the user operation to the control unit 100.

In the installer 102', a PDL determining unit 1210' determines the value of the item "PDL" in the pieces of attribute information included in the search result on the basis of the priority order, and extracts a driver program as a candidate to be installed.

In the second embodiment, the functions of the printer 20a and the server 30 are the same as the functions described using FIG. 8 and FIG. 9. Thus, the explanation thereof will be omitted.

Figure 17:
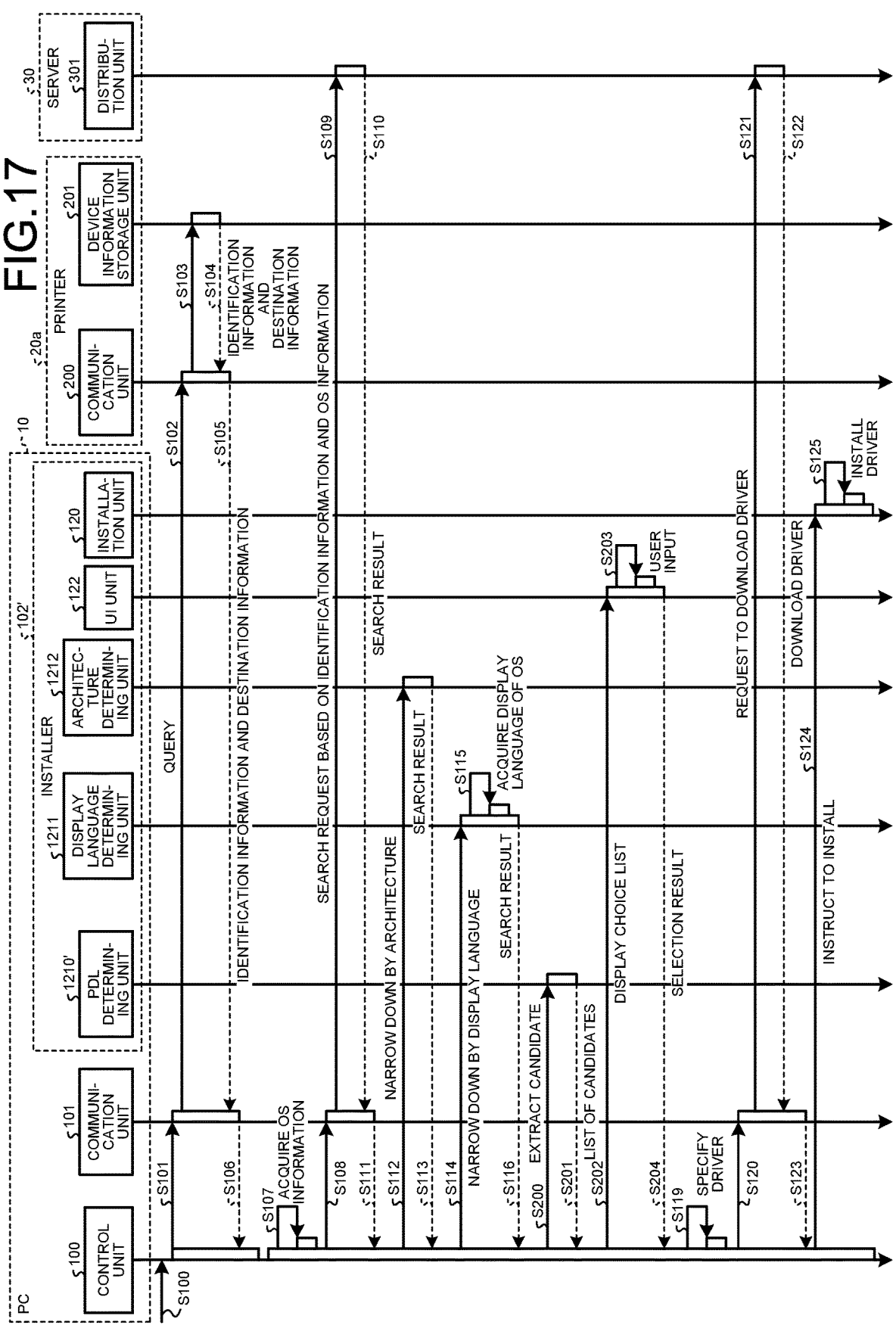
FIG. 17 is an exemplary sequence diagram illustrating a flow of installing a driver program in a PC according to the second embodiment.

Next, installation of a driver program in the PC 10 according to the second embodiment will be described in more detail. FIG. 17 is an exemplary sequence diagram illustrating a flow of installing a driver program in the PC 10 according to the second embodiment. In FIG. 17, portions corresponding to FIG. 10 and FIG. 16 described above are denoted by the same reference numerals, and the detailed description thereof will be omitted.

In FIG. 17, processes from step S100 to step S116 are the same as the processes from step S100 to step S116 in FIG. 10 illustrated above. Thus, the description thereof will be omitted.

At step S200 and S201, the control unit 100 creates a list of driver programs as candidates to be installed on the basis of the PDL type, for the search result that is narrowed down by the driver architecture and the display language of the OS, by the processes up to step S116. At step S200, the control unit 100 transmits the search result that is received at step S116 on the basis of the processes illustrated in the flowchart of FIG. 14, to the installer 102', and instructs the installer 102' to perform the determination on the basis of the PDL to extract attribute information as a candidate to be installed.

Figure 18:
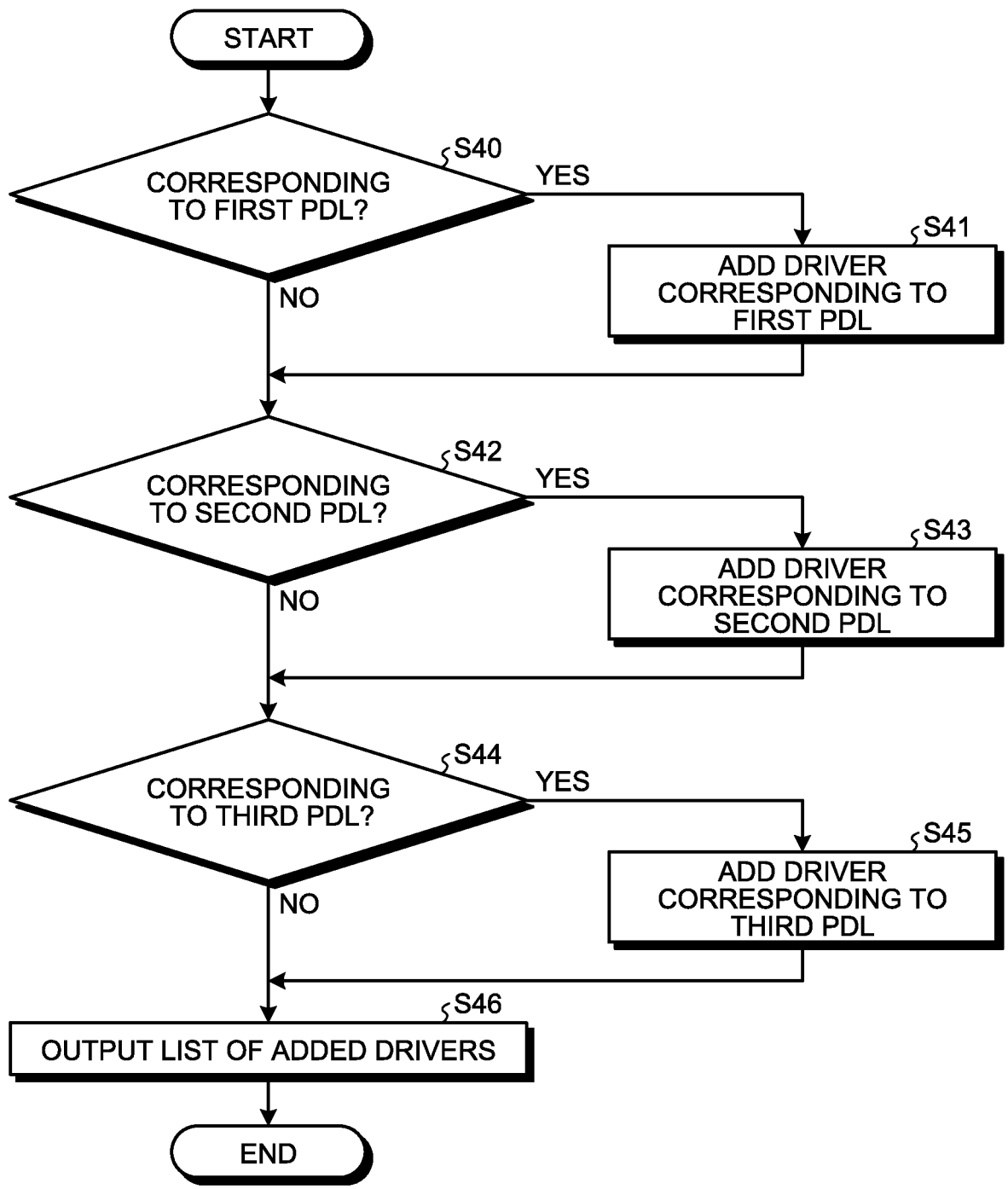
FIG. 18 is a flowchart illustrating an example of a determination process performed by a PDL determining unit according to the second embodiment.

FIG. 18 is a flowchart illustrating an example of a determination process performed by the PDL determining unit 1210' according to the second embodiment. It is assumed that the priority order of the pieces of PDL information is the same as the priority order explained in FIG. 15. In FIG. 18, at step S40, the PDL determining unit 1210' determines whether at least one of the pieces of attribute information in the search result corresponds to the PDL type "first PDL" with the highest priority order.

When it is determined that there is attribute information corresponding to the PDL type "first PDL" ("Yes" at step S40), the PDL determining unit 1210' moves the process to step S41. At step S41, based on the determination result at step S40, the PDL determining unit 1210' selects the driver program corresponding to the attribute information that is associated with the PDL type "first PDL", among the pieces of attribute information in the search result, as the driver program to be installed. The PDL determining unit 1210' then adds the selected driver program to the list of driver programs as candidates to be installed. The PDL determining unit 1210' then moves the process to step S42.

When it is determined that there is no attribute information corresponding to the PDL type "first PDL" at step S40 ("No" at step S40), the PDL determining unit 1210' moves the process to step S42.

At step S42, the PDL determining unit 1210' determines whether at least one of the pieces of attribute information in the search result corresponds to the PDL type "second PDL".

When it is determined that there is attribute information corresponding to the PDL type "second PDL" ("Yes" at step S42), the PDL determining unit 1210' moves the process to step S43. At step S43, based on the determination result at step S42, the PDL determining unit 1210' selects the driver program corresponding to the attribute information that is associated with the PDL type "second PDL", among the pieces of attribute information in the search result, as the driver program to be installed. The PDL determining unit 1210' then adds the selected driver program to the list of driver programs as candidates to be installed described above. The PDL determining unit 1210' then moves the process to step S44.

At step S42, when it is determined that there is no attribute information corresponding to the PDL type "second PDL" ("No" at step S42), the PDL determining unit 1210' moves the process to step S44.

At step S44, the PDL determining unit 1210' determines whether at least one of the pieces of attribute information in the search result corresponds to the PDL type "third PDL".

When it is determined that there is attribute information corresponding to the PDL type "third PDL" ("Yes" at step S44), the PDL determining unit 1210' moves the process to step S45. At step S45, based on the determination result at step S44, the PDL determining unit 1210' selects the driver program corresponding to the attribute information that is associated with the PDL type "third PDL", among the pieces of attribute information in the search result, as the driver program to be installed. The PDL determining unit 1210' then adds the selected driver program to the list of driver programs as candidates to be installed described above. The PDL determining unit 1210' then moves the process to step S46.

At step S44, when it is determined that there is no attribute information corresponding to the PDL type "third PDL" ("No" at step S44), the PDL determining unit 1210' moves the process to step S46.

At step S46, the PDL determining unit 1210' outputs the list of driver programs added with the driver programs as candidates to be installed at step S41, step S43, and step S45, and transmits the list of driver programs to the control unit 100 (step S201 in FIG. 17).

Based on the list, which is received from the PDL determining unit 1210', of driver programs as candidates to be installed, the control unit 100 creates a choice list for selecting the driver program to be installed. Table 2 indicates an example of the choice list created on the basis of the pieces of attribute information in Table 1, for each piece of identification information of the printer.

TABLE 2

| Selected Printer | Choices | Display Order |
| --- | --- | --- |
| Printer #A | PDL #1 driver | 1 |
|  | PDL #2 driver | 2 |
|  | PDL #3 driver | 3 |
| Printer #B | PDL #2 driver | 1 |
|  | PDL #3 driver | 2 |
| Printer #C | PDL #1 driver | 1 |

As illustrated in Table 2, for example, when the model of the printer that is selected to be used from the PC 10 has the identification information "printer #A", the driver program as a candidate to be installed is a driver program that corresponds to the PDL types "PDL #1", "PDL #2", and "PDL #3", respectively. The control unit 100 creates the choice list including the driver programs corresponding to the PDL types "PDL #1", "PDL #2", and "PDL #3", respectively.

The control unit 100 arranges the driver names "PDL #1 driver", "PDL #2 driver", and "PDL #3 driver" indicating the driver programs that correspond to the PDL types "PDL #1", "PDL #2", and "PDL #3", respectively, in an order according to the priority order of the corresponding PDL types "PDL #1", "PDL #2", and "PDL #3", to create the choice list. In the example illustrated in Table 2, the driver name "PDL #1 driver" of the driver program that corresponds to the PDL type "PDL #1" with the highest priority order is arranged at the top of the choice list. The driver name "PDL #3 driver" of the driver program that corresponds to the PDL type "PDL #3" with the lowest priority order is arranged at the bottom of the choice list.

Also when the selected printer has the identification information "printer #B" or "printer #C", the driver programs are similarly arranged in an order according to the priority order of the corresponding PDL types, to create the choice list.

Returning to the explanation in FIG. 17, the control unit 100 transmits the created choice list to the UI unit 122, and instructs the UI unit 122 to create a choice list screen for selecting the driver program to be installed, from the choice list (step S202). The UI unit 122 creates the choice list screen on the basis of the choice list received from the control unit 100, and causes the display unit 103 to display the choice list screen on the display 1004 of the PC 10.

Figure 19:
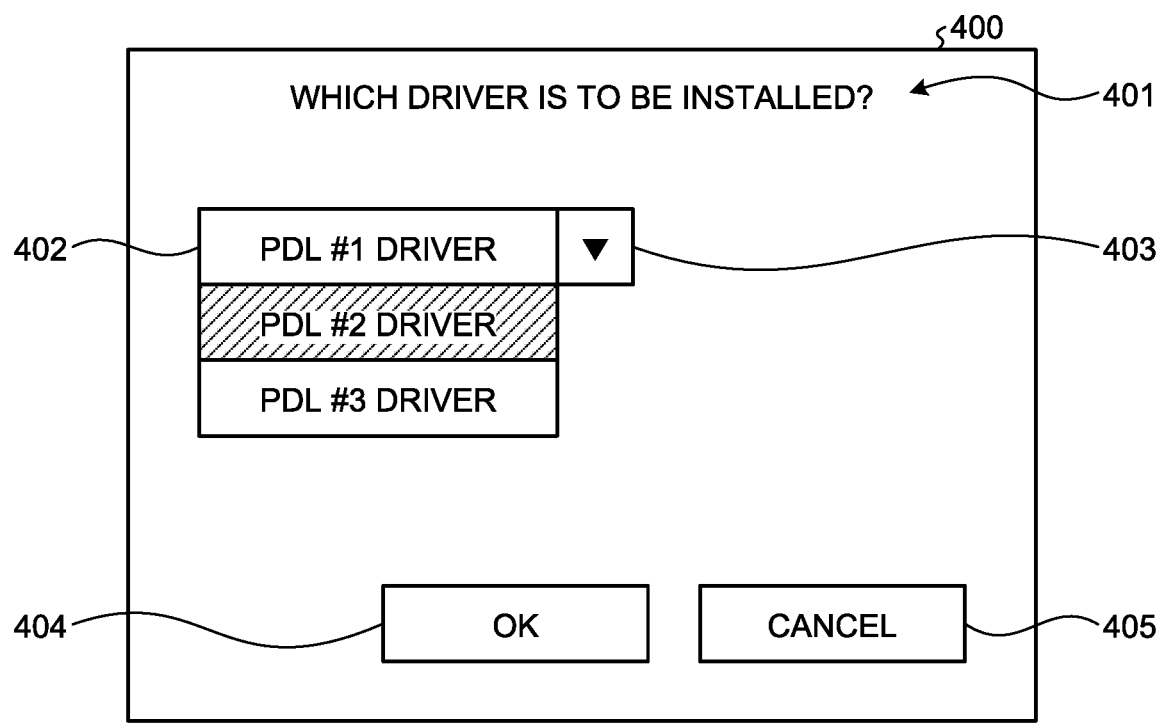
FIG. 19 is a diagram illustrating an example of a choice list screen according to the first embodiment.

FIG. 19 is an example of a choice list screen 400 created by the UI unit 122 according to the first embodiment. In FIG. 19, the choice list screen 400 includes a message display part 401, a selection part 402, an extension button 403, an "OK" button 404, and a "cancel" button 405. For example, a message for urging the user to select a driver program is displayed on the message display part 401. In the selection part 402, the driver names "PDL #1 driver", "PDL #2 driver", and "PDL #3 driver" of the driver programs in the choice list are displayed in an order according to the priority order of the corresponding PDL types.

The extension button 403 extends the display area of the selection part 402. For example, by default, only the driver program in which the priority order of the corresponding PDL type is the highest is displayed on the selection part 402, among the driver programs included in the choice list. By operating the extension button 403 at this state, information on all the driver programs included in the choice list will be displayed on the selection part 402. The example in FIG. 19 indicates a state when the extension button 403 is operated and information on all the driver programs included in the choice list are displayed.

When the "OK" button 404 is operated, the driver program designated in the selection part 402 is selected as the driver program to be installed. In the example in FIG. 19, the driver name "PDL #2 driver" is designated, among the driver names "PDL #1 driver", "PDL #2 driver", and "PDL #3 driver" displayed on the selection part 402. When the "OK" button 404 is operated at this state, the driver program of the designated driver name "PDL #2 driver" is selected as the driver program to be installed.

The "cancel" button 405 cancels the process according to the choice list screen 400. For example, when the "cancel" button 405 is operated, the installation of the driver program in the PC 10 will be stopped.

Returning to the explanation in FIG. 17, when the driver program is designated in the selection part 402 and the user has operated the "OK" button 404 on the choice list screen 400 (step S203), the UI unit 122 transmits the selection result of the driver program to the control unit 100 (step S204).

Based on the selection result of the driver program received from the UI unit 122 at step S204, the control unit 100 specifies the driver program to be installed (step S119). Thereafter, processes from step S120 to step S125 are the same as the processes illustrated in FIG. 10. Thus, the description thereof will be omitted.

In this manner, in the second embodiment, the driver program to be installed can be selected from the driver programs that are candidates to be installed and displayed on the choice list screen 400, according to the user operation. Consequently, for example, the user can install a driver program suitable for the usage, instead of the driver program with the highest performance. Also, because the driver programs are displayed in an order according to the priority order on the choice list screen 400, the user can easily select a driver program with higher performance.

An embodiment offers an advantage that it is possible to easily acquire a driver program suitable for a model.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing device comprising:
   a memory configured to store computer-executable instructions; and
   one or more processors configured to execute the computer-executable instructions such that the one or more processors execute a process including:
   acquiring identification information for identifying a model of a printer;
   acquiring system information that indicates an operating system of the information processing device;
   acquiring attribute information indicating an attribute of each of a plurality of printer drivers applicable to the model and the operating system, wherein each piece of attribute information comprises:
      identification information for identifying the model of the printer supported by a printer driver;
      an architecture of the printer driver and a performance indicator of the printer driver with respect to the information processing device;
      a type of Page Description Language (PDL) implemented by the printer driver;
      a display language of the printer driver; and
      a version of the printer driver;
   determining a display order of the plurality of printer drivers, wherein each of the plurality of printer drivers is applicable to the operating system, based on a priority order that is determined in advance for the attribute information; and
   displaying the plurality of printer drivers in the display order.

2. The information processing device according to claim 1, wherein the process further comprises:
   selecting a printer driver corresponding to attribute information with a highest priority order, among the plurality of printer drivers corresponding to the identification information.

3. The information processing device according to claim 1, wherein the process further comprises:
   displaying the attribute information acquired by the attribute information acquisition unit in a list based on the priority order, and
   selecting a printer driver corresponding to attribute information that is designated according to display of the list, among the plurality of printer drivers.

4. The information processing device according to claim 1, wherein:
   each piece of attribute information further includes system information that indicates an operating system of a printer driver corresponding to the piece of attribute information, wherein
   the process further comprises selecting at least one printer driver from the plurality of printer drivers based on the system information, and further selecting a printer driver among the selected at least one printer drivers based on the priority order determined in advance for the attribute information.

5. The information processing device according to claim 1, wherein:
   each piece of attribute information further includes language information that indicates a display language of a printer driver corresponding to the piece of attribute information, and
   the process further comprises selecting at least one printer driver among the plurality of printer drivers, a display language indicated by the language information included in attribute information of each of the at least one printer driver matching with a display language selected in an operating system installed in the information processing device, and further selecting a printer driver among the selected at least one printer driver based on the priority order determined in advance for the attribute information.

6. The information processing device according to claim 1, wherein:
   each piece of attribute information further includes acquisition information that indicates an acquisition method of a printer driver corresponding to the piece of attribute information, and
   the process further comprises acquiring the selected print driver among the plurality of printer drivers, based on the acquisition information.

7. The information processing device according to claim 6, wherein the process further comprises:
   installing the acquired printer driver in the information processing device.

8. The information processing device according to claim 1, wherein the process further comprises:
   selecting one of the plurality of printer drivers; and
   installing the selected printer driver in the information processing device.

9. The information processing device according to claim 1, wherein the attribute information further comprises information for acquiring the printer driver.

10. An information processing system comprising a circuitry configured to:
- acquire system information that indicates an operating system of the information processing system;
- store identification information for identifying a model of a printer and attribute information indicating an attribute of each of a plurality of printer drivers applicable to the model and the operating system in association with each other;
- acquire identification information for identifying the model of the printer, from the printer;
- acquire attribute information associated with the acquired identification information, from the stored attribute information, the attribute information indicating an attribute of each of a plurality of printer drivers applicable to the model and the operating system, wherein each piece of attribute information comprises:
  - identification information for identifying the model of the printer supported by a printer driver;
  - an architecture of the print driver and a performance indicator of the printer driver with respect to the information processing device;
  - a type of Page Description Language (PDL) implemented by the printer driver;
  - a display language of the printer driver; and
  - a version of the printer driver;
- determine a display order of the plurality of printer drivers, wherein each of the plurality of printer drivers is applicable to the operating system, based on a priority order that is determined in advance for the attribute information; and
- display the plurality of printer drivers in the display order.

11. An information processing method comprising:
- acquiring identification information for identifying a model of a printer;
- acquiring system information that indicates an operating system of the information processing device;
- acquiring attribute information indicating an attribute of each of a plurality of printer drivers applicable to the model and the operating system, wherein each piece of attribute information comprises:
  - identification information for identifying the model of the printer supported by a printer driver;
  - an architecture of the print driver and a performance indicator of the printer driver with respect to the information processing device;
  - a type of Page Description Language (PDL) implemented by the printer driver;
  - a display language of the printer driver; and
  - a version of the print driver;
- determining a display order of the plurality of printer drivers, wherein each of the plurality of printer drivers is applicable to the operating system, based on a priority order that is determined in advance for the attribute information; and
- displaying the plurality of printer drivers in the display order.

* * * * *